United States Patent
Kanamori

(10) Patent No.: US 10,824,859 B2
(45) Date of Patent: Nov. 3, 2020

(54) AUTHENTICATION APPARATUS AND AUTHENTICATION METHOD

(71) Applicant: Panasonic Intellectual Property Management Co., Ltd., Osaka (JP)

(72) Inventor: Katsuhiro Kanamori, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 122 days.

(21) Appl. No.: 16/284,197

(22) Filed: Feb. 25, 2019

(65) Prior Publication Data
US 2019/0266399 A1 Aug. 29, 2019

(30) Foreign Application Priority Data
Feb. 28, 2018 (JP) .................................. 2018-035850

(51) Int. Cl.
G06K 9/00 (2006.01)
G06F 21/32 (2013.01)
G06K 9/20 (2006.01)

(52) U.S. Cl.
CPC ......... *G06K 9/00604* (2013.01); *G06F 21/32* (2013.01); *G06K 9/00617* (2013.01); *G06K 9/2036* (2013.01)

(58) Field of Classification Search
CPC ........... G06K 9/00604; G06K 9/00617; G06K 9/2036; G06F 21/32
(Continued)

(56) References Cited

U.S. PATENT DOCUMENTS 5,291,560 A 3/1994 Daugman
2004/0202354 A1* 10/2004 Togino ............... G06K 9/00604
382/117
(Continued)

FOREIGN PATENT DOCUMENTS

JP 9-276319 10/1997
JP 3307936 5/2002
(Continued)

OTHER PUBLICATIONS

Ichihashi Yuichi et al., "Analysis of polarization characteristic in the living human eye", Journal of Ophthalmological Optics Society of Japan, vol. 10, 1, pp. 87-92, 1989 (with English abstract on p. 92 and cited in the specification).
(Continued)

*Primary Examiner* — Juan A Torres
(74) *Attorney, Agent, or Firm* — Wenderoth, Lind & Ponack, L.L.P.

(57) ABSTRACT

An authentication apparatus includes: an illumination device outputting light having a first polarization direction; a camera taking a first eyeball image, a second eyeball image, and a third eyeball image, of the user, which have a second polarization direction, a third polarization direction, a fourth polarization direction, respectively; and a control circuit. The control circuit (a) acquires cornea authentication information and iris authentication information, (b) generates an amplitude image, a phase image, and an average image, using the first eyeball image, the second eyeball image, and the third eyeball image, (c) authenticates a user ID corresponding to the average image, by referring to the iris authentication information, (d) authenticates a user ID corresponding to the amplitude image and the phase image, by referring to the cornea authentication information, and (e)
(Continued)

determines a user ID corresponding to the user, using authentication results of the user ID in (c) and (d).

28 Claims, 24 Drawing Sheets

(58) Field of Classification Search
USPC ........................................................ 382/117
See application file for complete search history.

(56) References Cited

U.S. PATENT DOCUMENTS

| | | |
|---|---|---|
| 2006/0050933 A1 | 3/2006 | Adam et al. |
| 2009/0161923 A1* | 6/2009 | Kondo ............... G06K 9/00597 382/117 |
| 2010/0074477 A1* | 3/2010 | Fujii ................. G06K 9/00604 382/117 |
| 2017/0161578 A1 | 6/2017 | Ivanisov et al. |
| 2017/0316266 A1* | 11/2017 | Kawabata .......... G06K 9/00617 |
| 2018/0140187 A1* | 5/2018 | Watanabe .......... G06K 9/00604 |
| 2018/0357475 A1* | 12/2018 | Honda ................. G06K 9/0061 |
| 2019/0019025 A1* | 1/2019 | Yamazaki .......... G06K 9/00604 |
| 2019/0079581 A1* | 3/2019 | Tsurumi ................ G06K 9/209 |
| 2019/0266398 A1* | 8/2019 | Kanamori ............. G06T 3/4038 |

FOREIGN PATENT DOCUMENTS

| | | |
|---|---|---|
| JP | 2008-504606 | 2/2008 |
| WO | 94/09446 | 4/1994 |
| WO | 2006/023046 | 3/2006 |

OTHER PUBLICATIONS

Tomohiro Yamazaki et al., "Four-Directional Pixel-Wise Polarization CMOS Image Sensor Using Air-Gap Wire Grid on 2.5-μm Back-Illuminated Pixels", IEDM16-220, 2016 IEEE.

* cited by examiner

FIG. 6
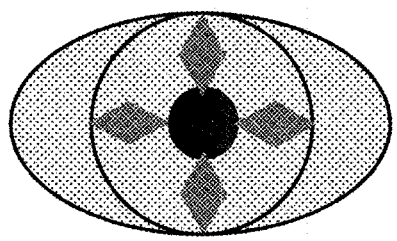
IMAGE L0C90
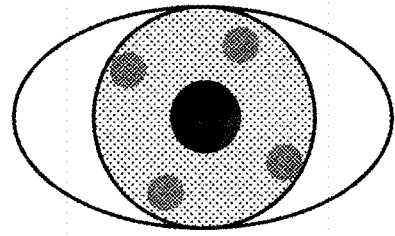
IMAGE L0C135
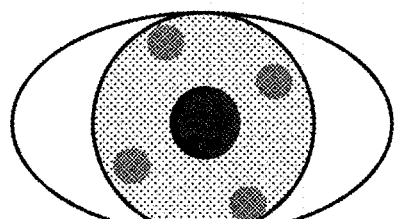
IMAGE L0C45
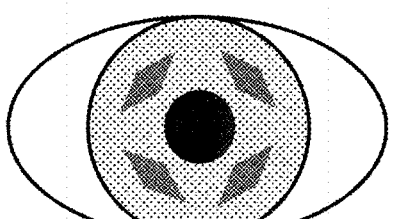
IMAGE L0C0
FIG. 7
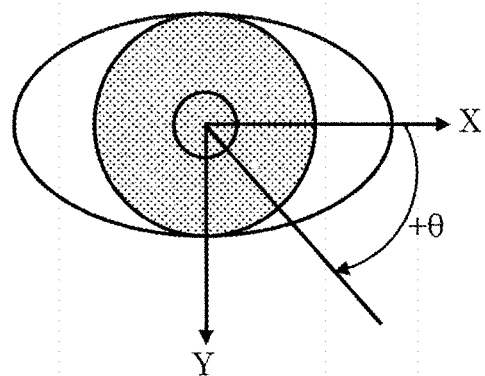

FIG. 8
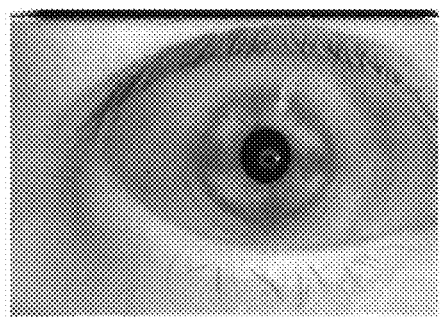
IMAGE L0C90
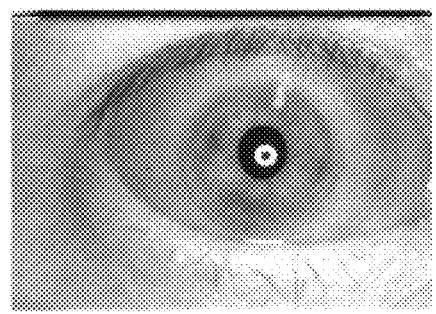
IMAGE L0C135
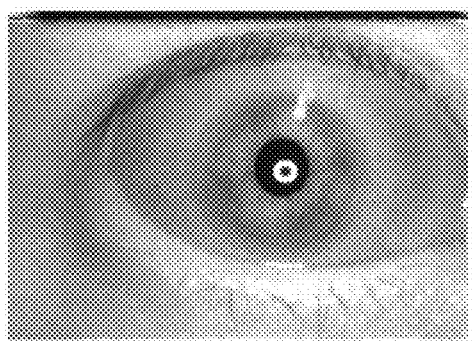
IMAGE L0C45
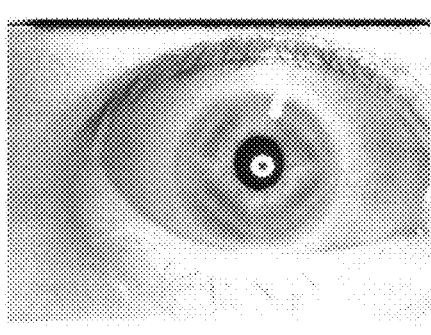
IMAGE L0C0

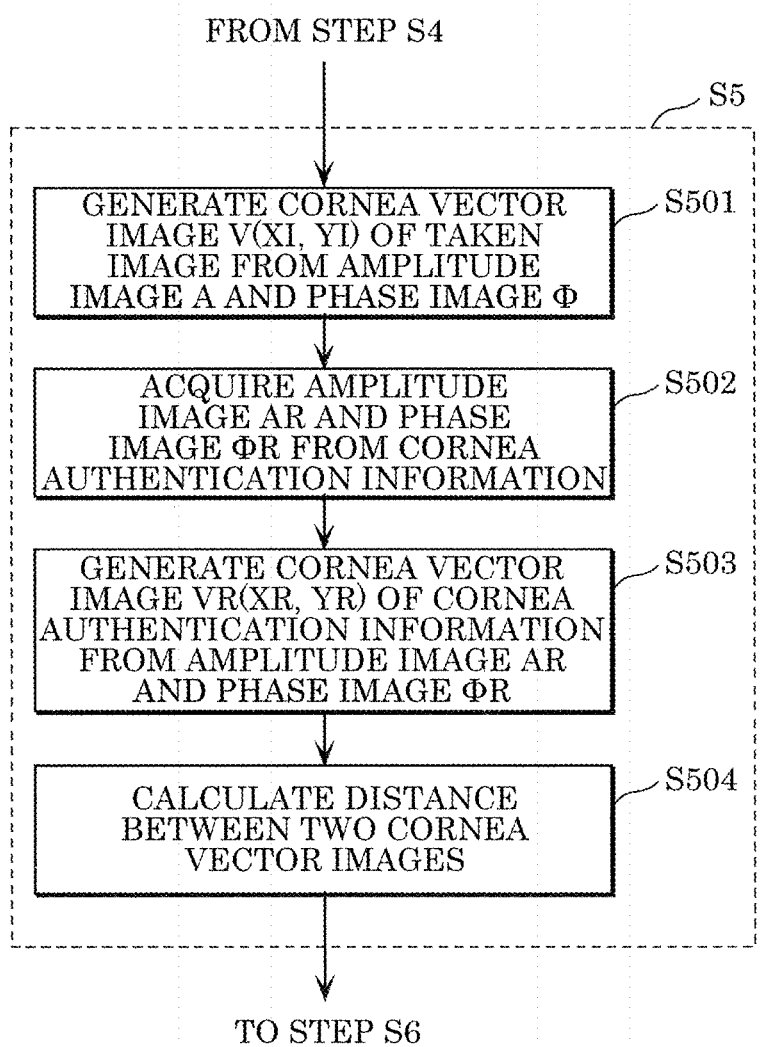

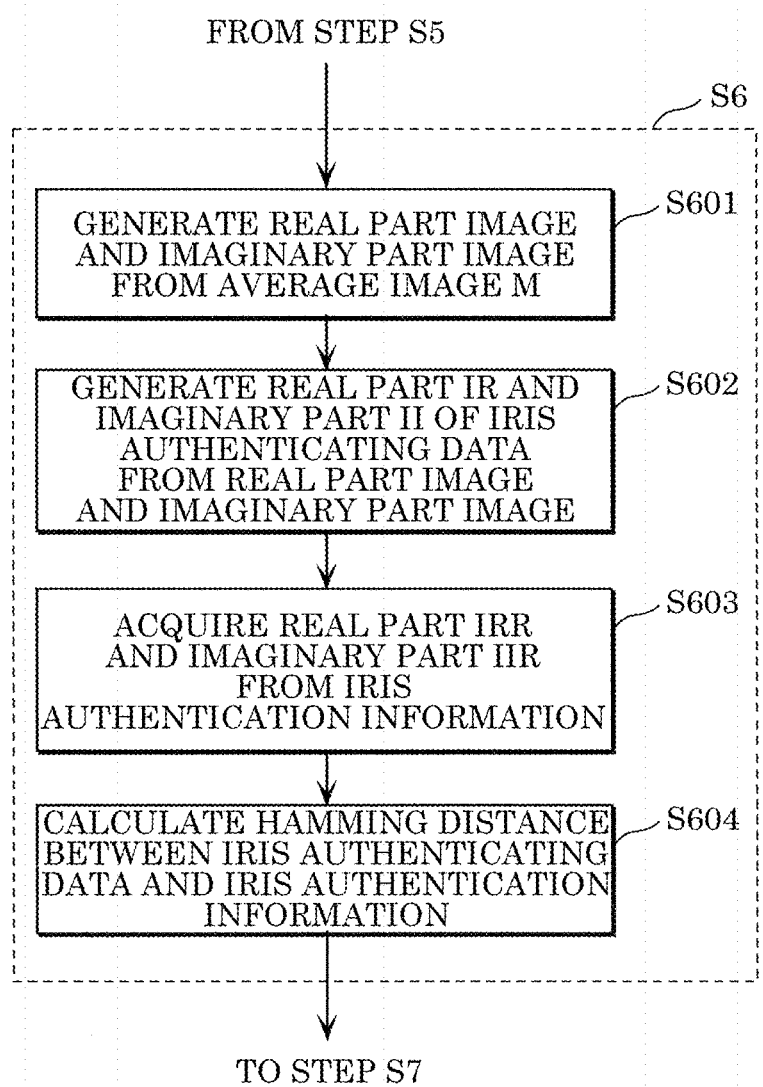

AUTHENTICATION APPARATUS AND AUTHENTICATION METHOD

CROSS REFERENCE TO RELATED APPLICATION

This application claims the benefit of priority of Japanese Patent Application Number 2018-035850 filed on Feb. 28, 2018, the entire content of which is hereby incorporated by reference.

BACKGROUND

1. Technical Field

The present disclosure relates to an eyeball authentication apparatus and authentication method.

2. Description of the Related Art

In recent years, authentication techniques each for authenticating an identity from the face of a person an image of which is taken by a camera have dramatically advanced. Among the authentication techniques is an iris authentication technique. The iris authentication technique is a method having a very low rate of erroneously authenticating a person who should not be authenticated (false acceptance rate FAR). For example, Japanese Patent No. 3307936 discloses the technique of extracting an image of an iris from an image of a human face, and determining the identity of the iris from the similarity between the iris code of the iris and a reference iris code.

SUMMARY

However, the iris authentication technique disclosed in Japanese Patent No. 3307936 has a problem of low accuracy.

Therefore, the present disclosure provides an authentication apparatus and an authentication method of eye authentication with enhanced accuracy.

An authentication apparatus according to one aspect of the present disclosure includes: an illumination device that outputs light having a first polarization direction; a camera that takes a first eyeball image of a user, a second eyeball image of the user, and a third eyeball image of the user, the first eyeball image having a second polarization direction, the second eyeball image having a third polarization direction, the third eyeball image having a fourth polarization direction; and a control circuit that (a) acquires cornea authentication information in which a user ID and at least one cornea image are associated with each other, and iris authentication information in which a user ID and at least one iris image are associated with each other, (b) generates an amplitude image, a phase image, and an average image by using the first eyeball image, the second eyeball image, and the third eyeball image, (c) authenticates a user ID corresponding to the average image by referring to the iris authentication information, (d) authenticates a user ID corresponding to the amplitude image and the phase image, by referring to the cornea authentication information, and (e) determines a user ID corresponding to the user, by using an authentication result of the user ID in (c), and an authentication result of the user ID in (d).

An authentication apparatus according to one aspect of the present disclosure includes: an illumination device that outputs light having a first polarization direction, light having a second polarization direction, and light having a third polarization direction; a camera that takes an image of light polarized in a fourth polarization direction, and takes a first eyeball image of a user using light having the first polarization direction, a second eyeball image of the user using light having the second polarization direction, and a third eyeball image of the user using light having the third polarization direction; and a control circuit that (a) acquires cornea authentication information in which a user ID and at least one cornea image are associated with each other, and iris authentication information in which a user ID and at least one iris image are associated with each other, (b) generates an amplitude image, a phase image, and an average image by using the first eyeball image, the second eyeball image, and the third eyeball image, (c) authenticates a user ID corresponding to the average image by referring to the iris authentication information, (d) authenticates a user ID corresponding to the amplitude image and the phase image, by referring to the cornea authentication information, and (e) determines a user ID corresponding to the user, by using an authentication result of the user ID in (c), and an authentication result of the user ID in (d).

An authentication method according to one aspect of the present disclosure includes: (a) outputting light having a first polarization direction; (b) at a time of the outputting of the light having the first polarization direction, taking a first eyeball image of a user, a second eyeball image of the user, and a third eyeball image of the user, the first eyeball image having a second polarization direction, the second eyeball image having a third polarization direction, the third eyeball image having a fourth polarization direction; (c) generating an amplitude image, a phase image, and an average image by using the first eyeball image, the second eyeball image, and the third eyeball image; (d) acquiring cornea authentication information in which a user ID and at least one cornea image are associated with each other, and iris authentication information in which a user ID and at least one iris image are associated with each other; (e) authenticating a user ID corresponding to the average image by referring to the iris authentication information; (f) authenticating a user ID corresponding to the amplitude image and the phase image, by referring to the cornea authentication information; and (g) determining a user ID corresponding to the user, by using an authentication result of the user ID in (e), and an authentication result of the user ID in (f), wherein at least one of (a) to (g) is executed by at least one control circuit.

An authentication method according to one aspect of the present disclosure includes: (a) outputting light having a first polarization direction, light having a second polarization direction, and light having a third polarization direction; (b) taking a first eyeball image of a user at a time of the outputting of the light having the first polarization direction, taking a second eyeball image of the user at a time of the outputting of the light having the second polarization direction, and taking a third eyeball image of the user at a time of the outputting of the light having the third polarization direction, the first eyeball image having a fourth polarization direction, the second eyeball image having the fourth polarization direction, the third eyeball image having the fourth polarization direction; (c) generating an amplitude image, a phase image, and an average image by using the first eyeball image, the second eyeball image, and the third eyeball image; (d) acquiring cornea authentication information in which a user ID and at least one cornea image are associated with each other, and iris authentication information in which a user ID and at least one iris image are associated with each other; (e) authenticating a user ID corresponding to the average image by referring to the iris authentication information; (f) authenticating a user ID corresponding to the amplitude image and the phase image, by referring to the cornea authentication information; and (g) determining a user ID corresponding to the user, by using an authentication result of the user ID in (e), and an authentication result of the user ID in (f), wherein at least one of (a) to (g) is executed by at least one control circuit.

It should be noted that the above-described general or specific aspects may be implemented as a system, an apparatus, a method, an integrated circuit, a computer program, or a recording medium such as a computer-readable recording disk, or may be implemented as an arbitrary combination of the system, the apparatus, the method, the integrated circuit, the computer program, and the recoding medium.

The computer-readable recording medium includes, for example, a non-volatile recording medium such as a compact disc read only memory (CD-ROM).

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 6 is a schematic view of general image patterns shown in images taken by a camera due to a polarization optical effect of a cornea;

FIG. 7 is a schematic view illustrating an example of a camera coordinate system in an image of an eye with an origin at the center of an image of a cornea;

FIG. 8 is a view of four kinds of polarization images that are photographed in an experiment and correspond to the images in the schematic view illustrated in FIG. 6;

FIG. 15 is a flowchart illustrating an example of details of a cornea authentication process by a cornea authenticator;

FIG. 16 is a flowchart illustrating an example of details of an iris authentication process by an iris authenticator;

DETAILED DESCRIPTION OF THE EMBODIMENTS

[Findings of the Inventors]

Figure 1:
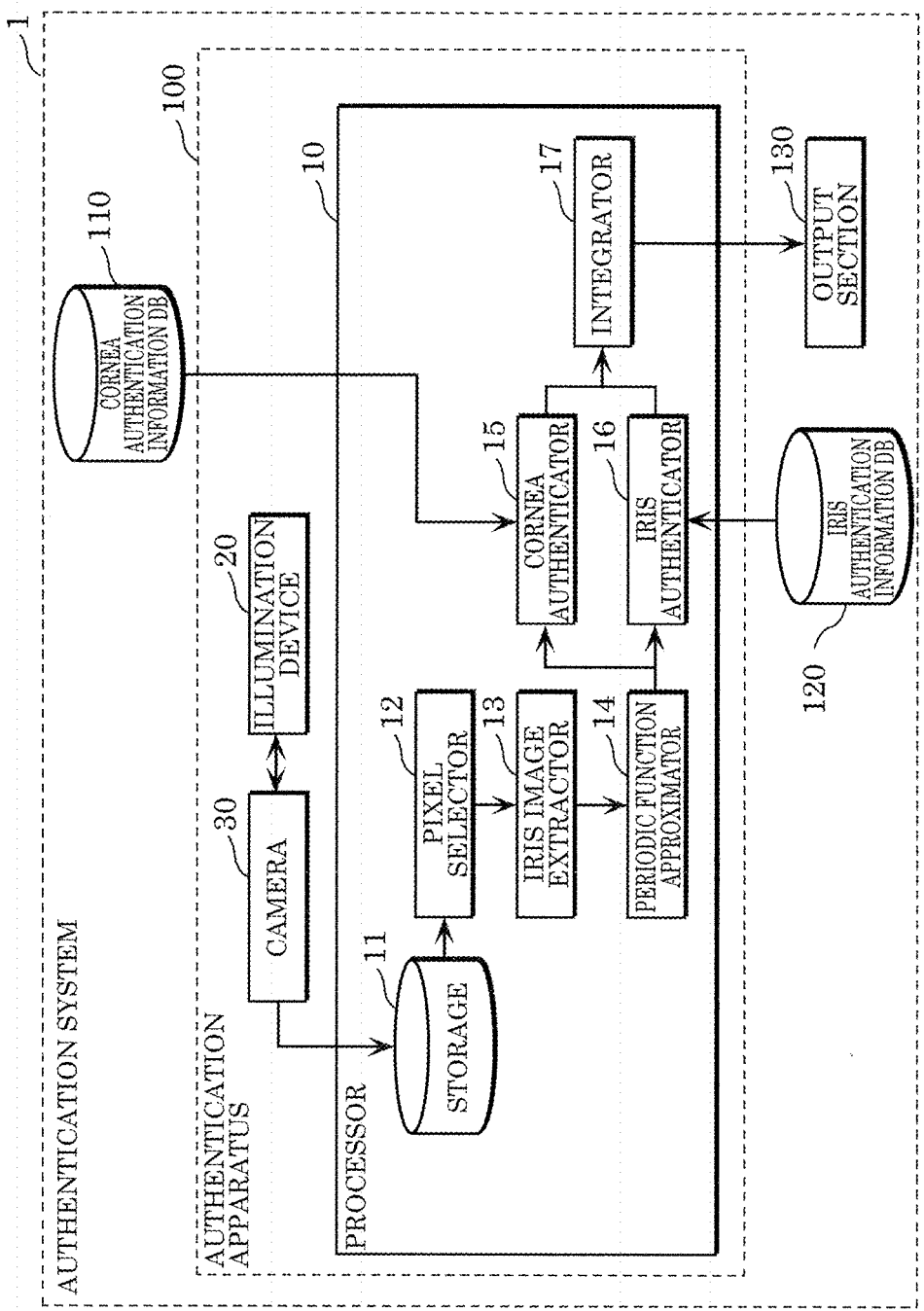
FIG. 1 is a block diagram illustrating an example of a functional configuration of an authentication system according to embodiment 1.

First of all, findings of the inventors will be described. As is also described in the section of BACKGROUND, there is cited the technique disclosed in Japanese Patent No. 3307936 as a conventional iris authentication technique. In the technique, a pupil center and an iris center are detected from an eyeball image first, and the pupil center and the iris center are modeled as circles having different centers and radiuses. Next, a doughnut-shaped iris image is developed into a rectangular image by using polar coordinate axes set at the pupil center, and is converted into a binary iris authentication pattern by using a Gabor filter or the like. As for an authentication process, authentication is based on a Hamming distance between signals of the iris authentication patterns.

In recent years, methods for spoofing devices featuring iris authentication such as a smartphone using false eyes have been made public, and countermeasures against the methods have been urgently required. As an example of the above described methods, there is a method in which a person attempting to invade a device creates a false eye with an imitated cornea by photographing the iris of an eye of a user of the device remotely, and placing a cheap soft contact lens or the like on a printed image of the iris.

There have been various conventional countermeasures against false eyes. In particular, there has been a method for detecting characteristics of corneas. For example, there is a method for detecting optical characteristic information of a cornea, which is normally transparent, by imaging an eye using polarized light. At the beginning, observation of polarization-optical characteristics of corneas was used in visualization of stress characteristics of corneas after ophthalmic surgery as in the techniques disclosed in "Analysis of polarization characteristic in the living human eye" (written by Ichihashi Yuichi, Kawabata Shuichi, Ishikawa Kazuo, and Hatada Toyohiko, Journal of Ophthalmological Optics Society of Japan, 1989, Vol. 10, 1, pp. 87-92) and Japanese Patent Laid-Open No. 9-276319. For example, in the technique disclosed in the specification of U.S. Patent Application Laid-Open No. 2017/0161578, living human eyes and false eyes are distinguished by the characteristics as above. More specifically, an eyeball is illuminated with two kinds of light, non-polarized light and polarized light in a selective manner, and two images of reflection light from the eyeball are taken, one under non-polarized light and the other under polarized light, using a camera with a polarizing plate. Alternatively, an eyeball is illuminated with one kind of polarized light, and images of reflection light from the eyeball are taken using a camera with two kinds of polarizing plates. When the images taken in these way are examined, in the image of the living human eye, a dark cross pattern due to polarization-optical characteristics of the cornea is observed, whereas in a false eye created with a soft contact lens or the like placed on a printed image, the above described pattern is not found. Utilizing a phenomenon like this, a living human eye and a false eye are distinguished.

As described above, there are the conventional techniques of detecting presence of polarization-optical characteristics of corneas of living human eyes by using images taken under polarized light, that is, using polarization images. However, in the conventional techniques, living human eye determination is all done by way of acquiring polarization optical characteristics of corneas. Therefore, the inventors studied a method of personal authentication using eyeballs in which living human eye determination based on polarization optical characteristics of corneas and iris authentication are used in combination.

For example, polarization-optical characteristics of a cornea is biological information that is determined by a surface shape of the cornea, optical anisotropic characteristic of collagen tissue, and the like, and is unique to individual and differs even between right and left eyeballs of each person. Further, it is very difficult to extract optical characteristic information of corneas because corneas are transparent to ordinary light. It is also very difficult to duplicate and reproduce polarization-optical characteristics of a cornea using a contact lens. Accordingly, the inventors have found that by using information on both an iris and a cornea, both countermeasures against false eyes and enhancement of accuracy of individual authentication can be achieved. Furthermore, a wavelength band of IR (infrared ray) used in illumination diminishes brightness contrast across a boundary of an iris and a white of the eye in an image, making image processing for iris detection difficult. The inventors have found that the problem can be also solved by using polarized light. Therefore, the inventors have invented the following technique that enables eye authentication with enhanced accuracy.

An authentication apparatus according to a first aspect of the present disclosure includes: an illumination device that outputs light having a first polarization direction; a camera that takes a first eyeball image of a user, a second eyeball image of the user, and a third eyeball image of the user, the first eyeball image having a second polarization direction, the second eyeball image having a third polarization direction, the third eyeball image having a fourth polarization direction; and a control circuit that (a) acquires cornea authentication information in which a user ID and at least one cornea image are associated with each other, and iris authentication information in which a user ID and at least one iris image are associated with each other, (b) generates an amplitude image, a phase image, and an average image by using the first eyeball image, the second eyeball image, and the third eyeball image, (c) authenticates a user ID corresponding to the average image by referring to the iris authentication information, (d) authenticates a user ID corresponding to the amplitude image and the phase image, by referring to the cornea authentication information, and (e) determines a user ID corresponding to the user, by using an authentication result of the user ID in (c), and an authentication result of the user ID in (d).

According to the above described aspect, the amplitude image and the phase image show the information on the cornea, and the average image shows the information on the iris. The authentication apparatus performs authentication of the user through eye authentication using the information on the cornea and the information on the iris. The eye authentication by the authentication apparatus like this is performed with high accuracy. Furthermore, using the three eyeball images increases calculation accuracy of the amplitude image, the phase image, and the average image. Note that, for example, the first polarization direction of the illumination device can be set at zero degrees. The second polarization direction of the camera can be set as zero degrees, the third polarization direction can be set at 45 degrees and the fourth polarizing direction can be set at 90 degrees.

In the authentication apparatus according to the first aspect of the present disclosure, when the control circuit succeeds in authentication with the user ID in (c), and succeeds in authentication with the user ID in (d), the control circuit may determine in (e) that the user ID corresponds to the user.

According to the above described aspect, the authentication apparatus identifies the owner when the authentication apparatus succeeds in both of authentication of the cornea and authentication of the iris. Therefore, accuracy of identification of the owner is enhanced.

In the authentication apparatus according to the first aspect of the present disclosure, when the control circuit fails in authentication with the user ID in (c), the control circuit may determine in (e) that the user ID does not correspond to the user.

According to the above described aspect, the rate at which a person who should not be authenticated is authenticated (false acceptance rate: FAR) is much lower when an iris is used than when a cornea is used. When authentication of the iris of an eye in process (c) fails, the authentication apparatus determines that authentication of the eye is unsuccessful. Throughput of the authentication apparatus is thereby increased.

In the authentication apparatus according to the first aspect of the present disclosure, when the control circuit fails in authentication with the user ID in (c), the control circuit may skip authentication of the user ID in (d), and determine in (e) that the user ID does not correspond to the user.

According to the above described aspect, when authentication of the iris of an eye in process (c) fails, the authentication apparatus determines that authentication of the eye is unsuccessful, and omits authentication of the cornea of the eye. The process is thereby simplified and throughput of the authentication apparatus is increased.

In the authentication apparatus according to the first aspect of the present disclosure, when the control circuit succeeds in authentication with a first user ID in (c), and fails in authentication with the first user ID in (d), the control circuit may determine in (e) that the first user ID does not correspond to the user, and may (f) further determine that the first eyeball image, the second eyeball image, and the third eyeball image are false images of an eyeball corresponding to the first user ID.

According to the above described aspect, the authentication apparatus determines that authentication of an eye is unsuccessful when authentication of the iris of the eye succeeds but authentication of the cornea of the eye fails. The cornea in the photographed image may be the one camouflaged with a contact lens or the like. In this case, the authentication apparatus determines that the photographed image is an image of a false eye, and thereby restraining occurrence of erroneous authentication.

In the authentication apparatus according to the first aspect of the present disclosure, the control circuit may determine a periodic function expressing periodicity of pixel values of pixels in corresponding pixel positions in the first eyeball image, the second eyeball image, and the third eyeball image, with respect to each of the pixel positions, and generate the amplitude image with a pixel value which is an amplitude of the periodic function, the phase image with a pixel value which is a phase of the periodic function, and the average image with a pixel value which is an average value of the periodic function.

According to the above described aspect, the periodic function expresses the periodicity of the pixel values of the first eyeball image, the second eyeball image, and the third eyeball image, and can express the change of the pixel value due to the difference in polarization direction. The amplitude image, the phase image, and the average image that are generated from the periodic function like this can show the characteristics of the images of the cornea and the iris corresponding to the difference in the polarization direction.

In the authentication apparatus according to the first aspect of the present disclosure, the camera may take an image including the first eyeball image, the second eyeball image, and the third eyeball image together at a time of output of light having the first polarization direction, and the control circuit may separate, in (b), the first eyeball image, the second eyeball image, and the third eyeball image from the image taken by the camera.

According to the above described aspect, the first eyeball image, the second eyeball image, and the third eyeball image are included in one image, and are acquired in taking the one image. Therefore, the images can be taken in a shorter time, and therefore can be taken with more sureness.

An authentication apparatus according to a second aspect of the present disclosure includes: an illumination device that outputs light having a first polarization direction, light having a second polarization direction, and light having a third polarization direction; a camera that takes an image of light polarized in a fourth polarization direction, and takes a first eyeball image of a user using light having the first polarization direction, a second eyeball image of the user using light having the second polarization direction, and a third eyeball image of the user using light having the third polarization direction; and a control circuit that (a) acquires cornea authentication information in which a user ID and at least one cornea image are associated with each other, and iris authentication information in which a user ID and at least one iris image are associated with each other, (b) generates an amplitude image, a phase image, and an average image by using the first eyeball image, the second eyeball image, and the third eyeball image, (c) authenticates a user ID corresponding to the average image by referring to the iris authentication information, (d) authenticates a user ID corresponding to the amplitude image and the phase image, by referring to the cornea authentication information, and (e) determines a user ID corresponding to the user, by using an authentication result of the user ID in (c), and an authentication result of the user ID in (d).

According to the above described aspect, the authentication apparatus can take the first eyeball image, the second eyeball image, and the third eyeball image equivalent to the eyeball images taken by the authentication apparatus according to the first aspect of the present disclosure. Therefore, the authentication apparatus performs the authentication process by using the first eyeball image, the second eyeball image, and the third eyeball image as is the case with the authentication apparatus according to the first aspect of the present disclosure. For example, the first polarization direction of the illumination device can be set at zero degrees, the second polarization direction can be set at 45 degrees, and the third polarization direction can be set at 90 degrees. The fourth polarization direction of the camera can be set at zero degrees.

In the authentication apparatus according to the second aspect of the present disclosure, when the control circuit succeeds in authentication with the user ID in (c), and succeeds in authentication with the user ID in (d), the control circuit may determine in (e) that the user ID corresponds to the user.

In the authentication apparatus according to the second aspect of the present disclosure, when the control circuit fails in authentication with the user ID in (c), the control circuit may determine in (e) that the user ID does not correspond to the user.

In the authentication apparatus according to the second aspect of the present disclosure, when the control circuit fails in authentication with the user ID in (c), the control circuit may skip authentication of the user ID in (d), and determine in (e) that the user ID does not correspond to the user.

In the authentication apparatus according to the second aspect of the present disclosure, when the control circuit succeeds in authentication with a first user ID in (c), and fails in authentication with the first user ID in (d), the control circuit may determine in (e) that the first user ID does not correspond to the user, and the control circuit may (f) further determine that the first eyeball image, the second eyeball image, and the third eyeball image are false images of an eyeball corresponding to the first user ID.

In the authentication apparatus according to the second aspect of the present disclosure, the control circuit may determine a periodic function expressing periodicity of pixel values of pixels in corresponding pixel positions in the first eyeball image, the second eyeball image, and the third eyeball image, with respect to each of the pixel positions, and generate the amplitude image with a pixel value which is an amplitude of the periodic function, the phase image with a pixel value which is a phase of the periodic function, and the average image with a pixel value which is an average value of the periodic function.

In the authentication apparatus according to the second aspect of the present disclosure, the camera may take the first eyeball image, the second eyeball image, and the third eyeball image individually at a time of output of the light having the first polarization direction, the light having the second polarization direction, and the light having the third polarization direction, respectively.

According to the above described aspect, the camera takes and acquires the first eyeball image, the second eyeball image, and the third eyeball image individually. Therefore, the authentication apparatus can simplify processes concerning the first eyeball image, the second eyeball image, and the third eyeball image.

An authentication method according to a first aspect of the present disclosure includes: (a) outputting light having a first polarization direction; (b) at a time of the outputting of the light having the first polarization direction, taking a first eyeball image of a user, a second eyeball image of the user, and a third eyeball image of the user, the first eyeball image having a second polarization direction, the second eyeball image having a third polarization direction, the third eyeball image having a fourth polarization direction; (c) generating an amplitude image, a phase image, and an average image by using the first eyeball image, the second eyeball image, and the third eyeball image; (d) acquiring cornea authentication information in which a user ID and at least one cornea image are associated with each other, and iris authentication information in which a user ID and at least one iris image are associated with each other; (e) authenticating a user ID corresponding to the average image by referring to the iris authentication information; (f) authenticating a user ID corresponding to the amplitude image and the phase image, by referring to the cornea authentication information; and (g) determining a user ID corresponding to the user, by using an authentication result of the user ID in (e), and an authentication result of the user ID in (f), wherein at least one of (a) to (g) is executed by at least one control circuit. According to the above-described aspect, it is possible to obtain an advantageous effect equivalent to the authentication apparatus according to the first aspect of the present disclosure.

In the authentication method according to the first aspect of the present disclosure, when the authenticating of the user ID succeeds in (e), and the authenticating of the user ID succeeds in (f), the user ID may be determined as corresponding to the user in (g).

In the authentication method according to the first aspect of the present disclosure, when the authenticating of the user ID fails in (e), the user ID may be determined as not corresponding to the user in (g).

In the authentication method according to the first aspect of the present disclosure, when the authenticating of the user ID fails in (e), the authenticating of the user ID may be skipped in (f), and the user ID may be determined as not corresponding to the user in (g).

In the authentication method according to the first aspect of the present disclosure, when the authenticating of a first user ID succeeds in (e), and the authenticating of the first user ID fails in (f), the first user ID may be determined as not corresponding to the user in (g), and the authentication method may further include (h) determining that the first eyeball image, the second eyeball image, and the third eyeball image are false images of an eyeball corresponding to the first user ID.

In the authentication method according to the first aspect of the present disclosure, in (c), a periodic function expressing periodicity of pixel values of pixels in corresponding pixel positions in the first eyeball image, the second eyeball image, and the third eyeball image, may be determined with respect to each of the pixel positions, and the amplitude image with a pixel value which is an amplitude of the periodic function, the phase image with a pixel value which is a phase of the periodic function, and the average image with a pixel value which is an average value of the periodic function may be generated.

In the authentication method according to the first aspect of the present disclosure, in (b), an image including the first eyeball image, the second eyeball image, and the third eyeball image together may be taken at a time of output of light having the first polarization direction, and in (c), the first eyeball image, the second eyeball image, and the third eyeball image may be separated from the image taken.

An authentication method according to a second aspect of the present disclosure includes: (a) outputting light having a first polarization direction, light having a second polarization direction, and light having a third polarization direction; (b) taking a first eyeball image of a user at a time of the outputting of the light having the first polarization direction, taking a second eyeball image of the user at a time of the outputting of the light having the second polarization direction, and taking a third eyeball image of the user at a time of the outputting of the light having the third polarization direction, the first eyeball image having a fourth polarization direction, the second eyeball image having the fourth polarization direction, the third eyeball image having the fourth polarization direction; (c) generating an amplitude image, a phase image, and an average image by using the first eyeball image, the second eyeball image, and the third eyeball image; (d) acquiring cornea authentication information in which a user ID and at least one cornea image are associated with each other, and iris authentication information in which a user ID and at least one iris image are associated with each other; (e) authenticating a user ID corresponding to the average image by referring to the iris authentication information; (f) authenticating a user ID corresponding to the amplitude image and the phase image, by referring to the cornea authentication information; and (g) determining a user ID corresponding to the user, by using an authentication result of the user ID in (e), and an authentication result of the user ID in a wherein at least one of (a) to (g) is executed by at least one control circuit. According to the above-described aspect, it is possible to obtain an advantageous effect equivalent to the authentication apparatus according to the second aspect of the present disclosure.

In the authentication method according to the second aspect of the present disclosure, when the authenticating of the user ID succeeds in (e), and the authenticating of the user ID succeeds in (f), the user ID may be determined as corresponding to the user in (g).

In the authentication method according to the second aspect of the present disclosure, when the authenticating of the user ID fails in (e), the user ID may be determined as not corresponding to the user in (g).

In the authentication method according to the second aspect of the present disclosure, when the authenticating of the user ID fails in (e), the authenticating of the user ID may be skipped in (f), and the user ID may be determined as not corresponding to the user in (g).

In the authentication method according to the second aspect of the present disclosure, when the authenticating of a first user ID succeeds in (e), and the authenticating of the first user ID fails in (f), the first user ID may be determined as not corresponding to the user in (g), and the authentication method may further include (h) determining that the first eyeball image, the second eyeball image, and the third eyeball image are false images of an eyeball corresponding to the first user ID.

In the authentication method according to the second aspect of the present disclosure, in (c), a periodic function expressing periodicity of pixel values of pixels in corresponding pixel positions in the first eyeball image, the second eyeball image, and the third eyeball image, may be determined with respect to each of the pixel positions, and the amplitude image with a pixel value which is an amplitude of the periodic function, the phase image with a pixel value which is a phase of the periodic function, and the average image with a pixel value which is an average value of the periodic function may be generated.

In the authentication method according to the second aspect of the present disclosure, the first eyeball image, the second eyeball image, and the third eyeball image may be individually taken at a time of output of the light having the first polarization direction, the light having the second polarization direction, and the light having the third polarization direction, respectively. It should be noted that the above-described general or specific aspects may be implemented as a system, an apparatus, a method, an integrated circuit, a computer program, or a recording medium such as a computer-readable recording disk, or may be implemented as an arbitrary combination of the system, the apparatus, the method, the integrated circuit, the computer program, and the recoding medium. The computer-readable recording medium includes, for example, a non-volatile recording medium such as a CD-ROM. In addition, the apparatus may comprise one or more apparatuses. When the apparatus comprises two or more apparatuses, the two or more apparatuses may be disposed in a single device, or may be individually disposed in two or more separate devices. In the specification and the appended claims, "apparatus" means not only one apparatus but also a system including a plurality of apparatuses.

The following describes in detail the authentication apparatus, etc. according to the present disclosure with reference to the drawings. Each of the embodiments described below shows a general or specific example. The numerical values, shapes, structural components, the disposition and connection of the structural components, steps (processes), the processing order of the steps, etc. described in the following embodiments are mere examples, and do not intend to limit the present disclosure. In addition, among the structural components in the following embodiments, structural components not recited in any one of the independent claims are described as arbitrary structural elements. In addition, each of the diagrams is a schematic diagram and thus is not necessarily strictly illustrated. In each of the diagrams, substantially the same structural components are assigned with the same reference signs, and redundant descriptions will be omitted or simplified.

Embodiment 1

Authentication apparatus 100 according to embodiment 1 and authentication system 1 including authentication apparatus 100 will be described. In the following embodiment, authentication apparatus 100 generates an image for authentication by compositing images of an eyeball illuminated with linear polarized light. Further, authentication apparatus 100 determines a user ID corresponding to the image for authentication by comparing the image for authentication and an image in a database.

[1-1. Configuration of Authentication System]

Figure 2:
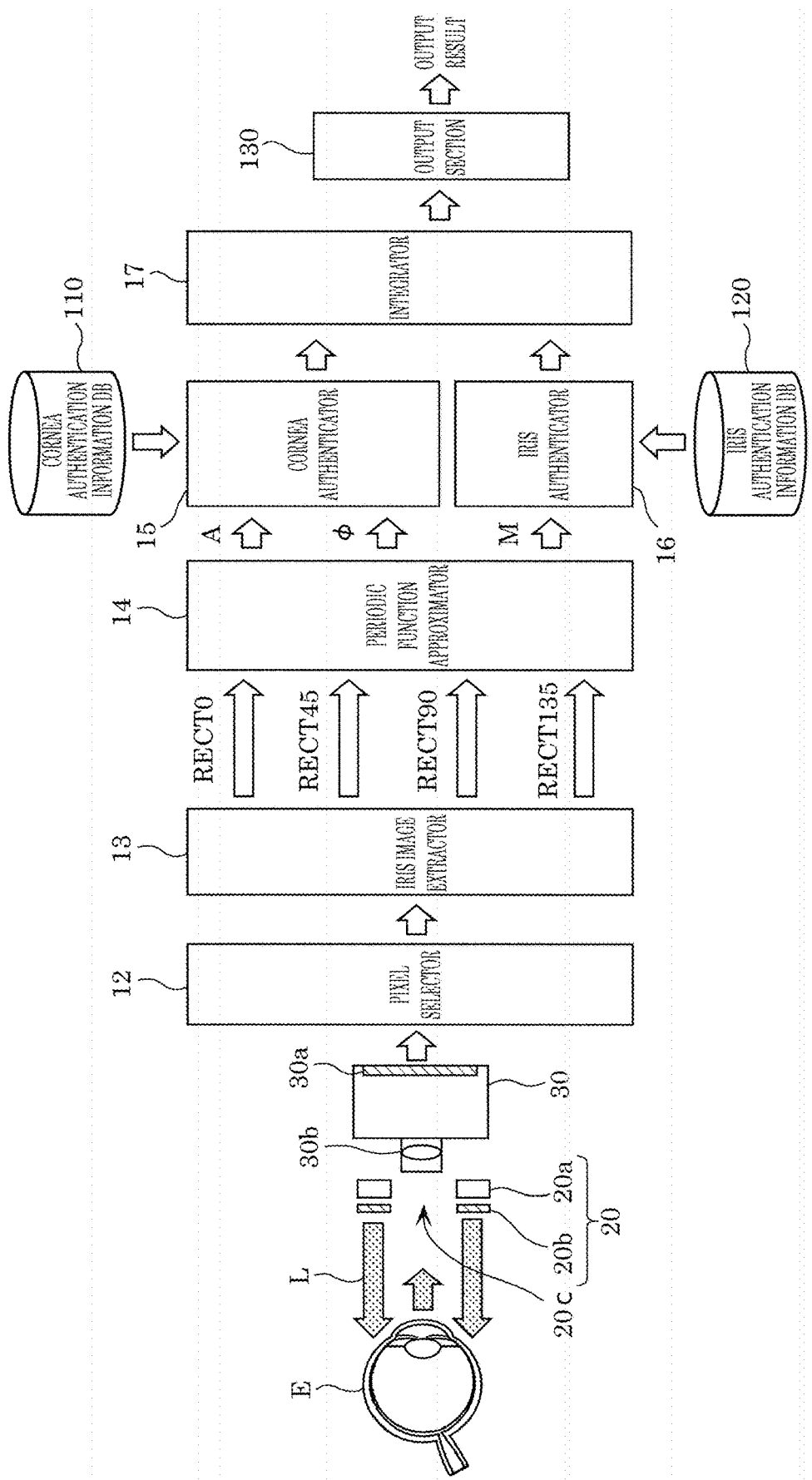
FIG. 2 is a schematic diagram illustrating an example of a process by components of the authentication system according to embodiment 1.

A configuration of authentication system 1 according to embodiment 1 will be described. FIG. 1 is a block diagram illustrating an example of a functional configuration of authentication system 1 according to embodiment 1. FIG. 2 is a schematic diagram illustrating an example of a process by components of authentication system 1 according to embodiment 1. As illustrated in FIG. 1, authentication system 1 according to embodiment 1 includes authentication apparatus 100, cornea authentication information database (hereinafter, also referred to as "cornea authentication information DB") 110, iris authentication information database (hereinafter, also referred to as "iris authentication information DB") 120, and output section 130. Authentication apparatus 100 includes processor 10, illumination device 20, and camera 30. Processor 10 includes storage 11, pixel selector 12, iris image extractor 13, periodic function approximator 14, cornea authenticator 15, iris authenticator 16, and integrator 17.

[Authentication Apparatus 100]

(Illumination Device 20)

As illustrated in FIG. 1 and FIG. 2, illumination device 20 of authentication apparatus 100 illuminates a subject of camera 30 with polarized light. In the present embodiment, the subject is human eyeball E. Illumination device 20 emits light polarized in one direction. Illumination device 20 includes illumination section 20a, and polarizing section 20b. Illumination section 20a and polarizing section 20b each have a ring shape surrounding opening portion 20c. Illumination section 20a emits light, and polarizing section 20b converts the light emitted from illumination section 20a into linear polarized light. Examples of the light emitted from illumination section 20a include infrared light and visible light. Examples of illumination section 20a include an illuminator, an illumination circuit, a light emitting element such as an LED (Light Emitting Diode) element, an electric bulb such as an infrared bulb, and a laser.

Figure 3:
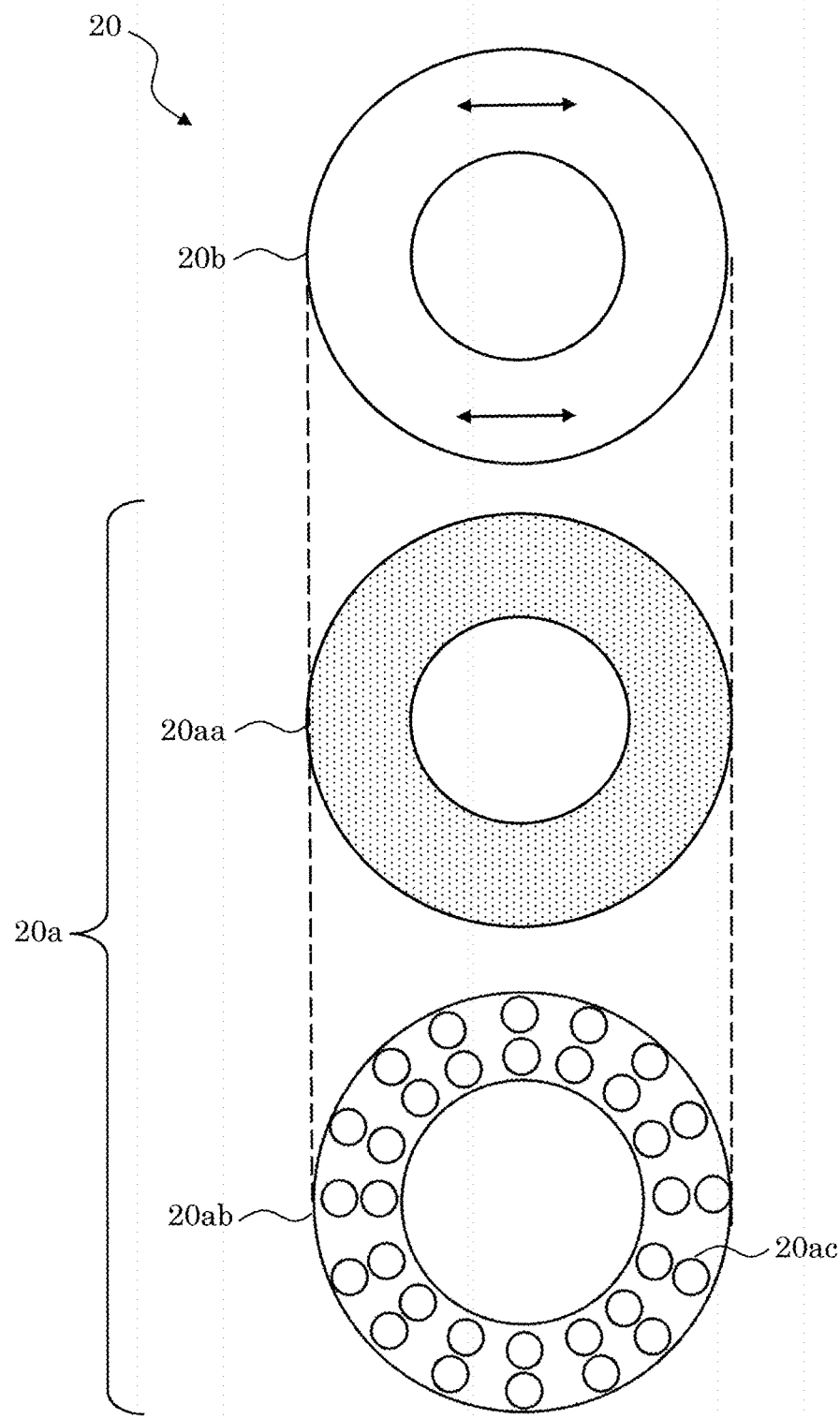
FIG. 3 is a schematic plane diagram of an exploded view of an illumination device according to embodiment 1.

FIG. 3 is a schematic plane diagram of an exploded view of illumination device 20 according to embodiment 1. In FIG. 3, illumination section 20a and polarizing section 20b that normally overlap each other are separated, and are illustrated in order of closeness to eye E from top down. In FIG. 3 and the other drawings, plan views and front views of the illumination device each illustrate a view seen in a direction opposite the direction of the illuminating light, that is, are drawings of a view of the illumination device seen by the subject of the camera. Further, the plan views and front views of the illumination device include linear arrows and circular arrows each indicating a polarization direction that is the direction of a polarization transmission axis that will be described later, and the directions of these arrows each indicate a direction as seen from the camera toward the subject, that is, as seen from the illumination device toward the subject.

As illustrated in FIG. 2 and FIG. 3, illumination section 20a includes light emitting section 20ab having the shape of an annular plate and provided with a plurality of light sources 20ac disposed on an entire surface, and a diffusion plate 20aa having the shape of an annular plate and disposed between light emitting section 20ab and polarizing section 20b. That is, polarizing section 20b, diffusion plate 20aa, and light emitting section 20ab are disposed in this order to be more distant from eye E. An example of light source 20ac is a light emitting element such as an LED element, an electric bulb such as an infrared bulb, or a laser light source. For example, light source 20ac generates infrared light of an IR wavelength of 850 nm or 940 nm. Light emitting section 20ab is configured to cause a plurality of light sources 20ac to emit light simultaneously, and thereby emits illuminating light in a circular manner toward diffusion plate 20aa. Illumination section 20a provides ring illumination of one channel.

Diffusion plate 20aa is disposed to cover all the light sources 20ac of light emitting section 20ab. Diffusion plate 20aa and light emitting section 20ab surround opening portion 20c. Diffusion plate 20aa diffuses and transmits light emitted from light sources 20ac, and emits the light toward polarizing section 20b. Diffusion plate 20aa may have any configuration if only diffusion plate 20aa diffuses light and transmits the light. Diffusion plate 20aa converts light emitted from a point light source such as an LED into light from a surface light source. Linear polarized light emitted from polarizing section 20b is diffused by diffusion plate 20aa, which results in lower brightness of a bright point in a mirror reflection due to regular reflection that occurs on an eyeglass or a cornea. Further, it is confirmed by the experiment by the inventors that the above described linear polarized light allows for more effectively removal of a bright point in a mirror reflection of polarized light by image processing even when an extinction ratio of the polarizing filter of polarizing section 20b is low. Note that diffusion plate 20aa is not essential.

Polarizing section 20b is a polarizing filter disposed between illumination section 20a and a subject, and an example of polarizing section 20b is a polarizing plate or a polarizing film. For example, polarizing section 20b may be a film-type wire-grid polarizing plate to polarize light in an IR wavelength band. Polarizing section 20b surrounds opening portion 20c. Polarizing section 20b has a polarization transmission axis in a direction of an angle in an image plane in a camera coordinate system of camera 30, that is, an azimuth angle of 0° (0 degrees). Polarizing section 20b changes light emitted from light source 20ac into linear polarized light with an azimuth angle of 0°. Note that in the image plane in the camera coordinate system, the above described azimuth angle increases clockwise, that is, in a right-hand turn direction, the azimuth angle of the horizontal direction is 0°, and the azimuth angle of the vertical direction is 90°. The above described azimuth angles each indicate a direction as seen from the camera toward the subject. This similarly applies to directions of polarization transmission axes of right-hand circular polarized light and left-hand circular polarized light that will be described later. The direction of the right-hand polarization transmission axis is clockwise in the image plane of the camera coordinate system, and the direction of the left-hand polarization transmission axis is counterclockwise. Note that in the present specification and the claims, the azimuth angle of the polarization transmission axis is also simply referred to as "polarization direction". In this way, in illumination device 20, light emitting section 20ab, diffusion plate 20aa, and polarizing section 20b are located in this order along the traveling direction of illuminating light.

Illumination device 20 as described above illuminates eyeball E of an object of authentication with ring-shaped illuminating light L that is linear polarized light in a polarization direction of an azimuth angle of 0° using light source 20ac emitting light. Return light reflected from a cornea and an iris portion of eyeball E passes through opening portion 20c in a center of doughnut-shaped illumination device 20, and is incident on camera 30. Note that hereinafter, illumination using linear polarized light in a polarization direction with an azimuth angle α° will be also referred to as "linear polarized illumination La" or "linear polarized light La".

(Camera 30)

As illustrated in FIG. 1 and FIG. 2, camera 30 of authentication apparatus 100 takes a digital image. Camera 30 may take either a still image or a moving image. Camera 30 includes polarization imaging device 30a, and objective lens 30b. Objective lens 30b receives return light reflected from eyeball E, and concentrates light onto polarization imaging device 30a. Polarization imaging device 30a captures an image formed by objective lens 30b on polarization imaging device 30a.

Figure 4A:
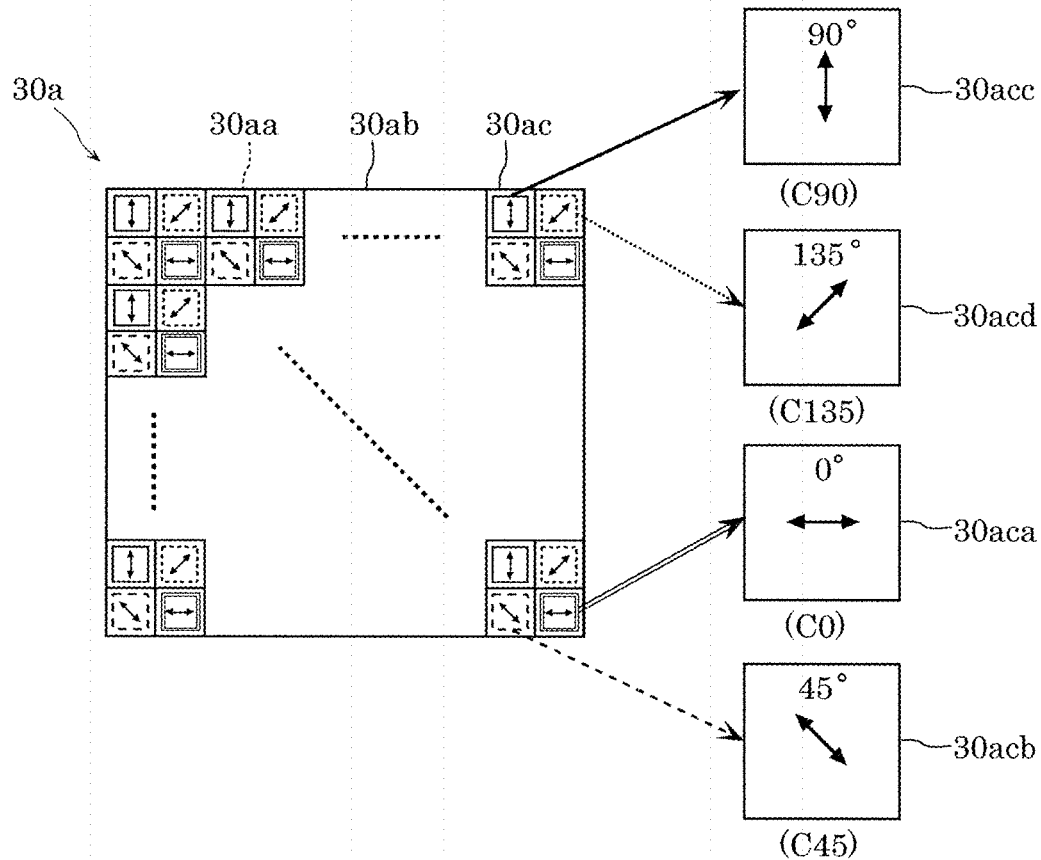
FIG. 4A is a plan view schematically illustrating a configuration of a polarization imaging device of a camera according to embodiment 1.
Figure 4B:
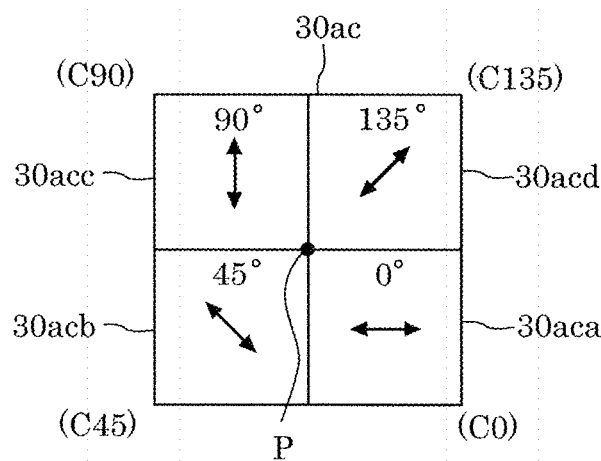
FIG. 4B is a plan view illustrating a unit group of polarizing filters in a mosaic polarizing filter in FIG. 4A.

FIG. 4A is a plan view schematically illustrating a configuration of polarization imaging device 30a of camera 30 according to embodiment 1. FIG. 4B is a plan view illustrating a unit group of polarizing filters in mosaic polarizing filter 30ab in FIG. 4A. In FIG. 4A and FIG. 4B and other drawings, plan views of the polarization imaging device and the group of polarizing filters are views seen from the camera toward the subject. In these plan views, linear arrows and circular arrows indicate the polarizing directions that are directions of the polarization transmission axes that will be described later, and the directions of these arrows indicate directions as seen from the camera toward the subject.

As illustrated in FIG. 4A, polarization imaging device 30a includes imaging device 30aa having light receiving elements, and mosaic polarizing filter 30ab disposed on imaging device 30aa. An example of mosaic polarizing filter 30ab is a mosaic polarizing plate or a mosaic polarizing film. Imaging device 30aa has a plurality of light receiving elements corresponding to respective pixels of an image to be captured. One light receiving element generates a pixel value of one pixel. The light receiving element outputs a signal indicating light characteristics such as brightness of received light to storage 11 of processor 10. Note that an example of the pixel value is brightness.

An example of imaging device 30aa is an image sensor such as a CMOS (Complementary Metal Oxide Semiconductor) image sensor and a CCD (Charge-Coupled Device) image sensor. Mosaic polarizing filter 30ab is disposed between objective lens 30b and imaging device 30aa, polarizes light incident on polarization imaging device 30a, and outputs the light to imaging device 30aa. Mosaic polarizing filter 30ab is disposed to cover entire imaging device 30aa. An example of mosaic polarizing filter 30ab is a wire grid. The light which is gathered onto polarization imaging device 30a from objective lens 30b passes through mosaic polarizing filter 30ab, and thereafter is incident on imaging device 30aa.

As illustrated in FIG. 4A and FIG. 4B, mosaic polarizing filter 30ab includes a plurality of polarizing filters that are disposed in a planar fashion. An example of the polarizing filters is a polarizing plate or a polarizing film. One polarizing filter is disposed for each of the light receiving elements of imaging device 30aa. Such polarizing filters are arranged in a grid pattern similarly to the light receiving elements. The plurality of polarizing filters include a plurality of first linear polarizing filters 30aca, a plurality of second linear polarizing filters 30acb, a plurality of third linear polarizing filters 30acc, and a plurality of fourth linear polarizing filters 30acd. In the image plane in the camera coordinate system of camera 30, the azimuth angle that is the angle of the polarization transmission axis of first linear polarizing filter 30aca is 0°. The azimuth angle of the polarization transmission axis of second linear polarizing filter 30acb is 45°. The azimuth angle of the polarization transmission axis of third linear polarizing filter 30acc is 90°. The azimuth angle of the polarization transmission axis of fourth linear polarizing filter 30acd is 135°. The axis with the azimuth angle of 0° is a reference axis of the horizontal direction for camera 30 and imaging device 30aa.

The linear polarizing filters 30aca to 30acd and the plurality of light receiving elements of imaging device 30aa align in the direction of the azimuth angle of 0° and the direction of the azimuth angle of 90°, forming a grid. Note that the azimuth angle of 0° of the polarization transmission axis of first linear polarizing filter 30aca is parallel with the azimuth angle of 0° of the polarization transmission axis of polarizing section 20b of illumination device 20. That is, the azimuth angles of the polarization transmission axes of linear polarizing filters 30aca to 30acd are configured to form 0°, 45° or 90° with the azimuth angles of the polarization transmission axis of polarizing section 20b.

Centering around point P, linear polarizing filters 30aca to 30acd are disposed adjacently to one another. First linear polarizing filter 30aca, second linear polarizing filter 30acb, third linear polarizing filter 30acc, and fourth linear polarizing filter 30acd are disposed in this order in a direction turning around point P. Such four linear polarizing filters 30aca to 30acd form one polarizing filter group 30ac. In one polarizing filter group 30ac, four linear polarizing filters 30aca to 30acd are disposed in a square with an array of 2 rows by 2 columns, that is, are disposed in a grid.

In mosaic polarizing filter 30ab, a plurality of polarizing filter groups 30ac are arranged in a grid, thus forming a mosaic pattern. The linear polarizing filters 30aca to 30acd are arranged in a grid, thus forming a mosaic pattern. First linear polarizing filter 30aca and the light receiving element of imaging device 30aa form a micro polarization pixel that in which incident light is polarized in a direction of 0° and then received. Second linear polarizing filter 30acb and the light receiving element of imaging device 30aa form a micro polarization pixel in which incident light is polarized in a direction of 45° and received. Third linear polarizing filter 30acc and the light receiving element of imaging device 30aa form a micro polarization pixel in which incident light is polarized in a direction of 90° and then received. Fourth linear polarizing filter 30acd and the light receiving element of imaging device 30aa form a micro polarization pixel in which incident light is polarized in a direction of 135° and then received One image that is acquired by such polarization imaging device 30a includes polarization pixels that are pixels polarized in the directions of 0°, 45°, 90°, and 135°.

In camera 30 as described above, light reflected off eyeball E forms an image on mosaic polarizing filter 30ab through objective lens 30b, is polarized by mosaic polarizing filter 30ab, and thereafter is received by imaging device 30aa. Imaging device 30aa outputs signals indicating information such as characteristics of light detected in the respective light receiving elements to storage 11 of processor 10. Camera 30 can acquire a polarized image including four kinds of polarization pixels via polarizing filters in the different polarization transmission axis directions of 0°, 45°, 90°, and 135° at once from the substantially same points of view, in a lighting period of illumination device 20.

(Processor 10)

With reference to FIG. 1 and FIG. 2, components of processor 10 of authentication apparatus 100 will be described. The components of processor 10 including pixel selector 12, iris image extractor 13, periodic function approximator 14, cornea authenticator 15, iris authenticator 16, and integrator 17 may be provided in a computer system (not illustrated) including a processor such as a CPU (Central Processing Unit) or a DSP (Digital Signal Processor), and memories such as a RAM (Random Access Memory) and a ROM (Read-Only Memory), and the like. Functions of some or all of the components may be provided by the CPU or DSP executing a program recorded in the ROM using the RAM as a working memory. Further, functions of some or all of the components may be achieved by an exclusive hardware circuit such as an electronic circuit or an integrated circuit. Functions of some or all of the respective components may be provided by a combination of the above described software function and the hardware circuit. The program may be provided by communication via a communication network such as the Internet, communication according to a mobile communication standard, other wireless networks, cable networks, broadcasting or the like. Here, processor 10 is an example of the control circuit.

Further, storage 11 enables storage and retrieval of various kinds of information. For example, storage 11 stores an image acquired by camera 30. Storage 11 may store programs for operating processor 10 and/or camera 30. These programs may be stored in memories (not illustrated) owned by processor 10 and camera 30. Storage 11 is realized by, for example, a semiconductor memory such as a ROM, a RAM, and a flash memory, a hard disk drive, or an SSD (Solid State Drive).

Pixel selector 12 generates four kinds of polarization images by performing reintegration of pixels acquired via first linear polarizing filters 30aca, pixels acquired via second linear polarizing filters 30acb, pixels acquired via third linear polarizing filters 30acc, and pixels acquired via fourth linear polarizing filters 30acd in the image acquired by polarization imaging device 30a of camera 30, individually.

A first polarization image of the four kinds of polarization images is an image composed of pixels each of which is polarization pixel C0 acquired via first linear polarizing filter 30aca. A second polarization image is an image composed of pixels each of which is polarization pixel C45 acquired via second linear polarizing filter 30acb. A third polarization image is an image composed of polarization pixel C90 that is a pixel acquired via third linear polarizing filter 30acc. A fourth polarization image is an image composed of pixels each of which is polarization pixel C135 acquired via fourth linear polarizing filter 30acd. Hereinafter, a polarization pixel acquired via a linear polarizing filter with an azimuth angle of a polarization transmission axis of B° will be also referred to as "polarization pixel Cβ".

Pixel selector 12 acquires an image captured by camera 30 from storage 11, generates a polarization image constituted composed of polarization pixels C0, a polarization image constituted composed of polarization pixels C45, a polarization image constituted composed of polarization pixels C90, and a polarization image constituted composed of polarization pixels C135 from the image, and outputs the polarization images to iris image extractor 13. Hereinafter, a polarization image composed of polarization pixels Cβ in an image taken under linear polarized light with an azimuth angle α° of a polarization transmission axis of polarizing section 20b of illumination device 20 will be also expressed as "polarization image LαCβ". Therefore, pixel selector 12 generates polarization images L0C0, L0C45, L0C90, and L0C135. Polarization images L0C0, L0C45, L0C90, and L0C135 are all reduced images of a size of H/2 in height and W/2 in width where the height and width of an image captured by polarization imaging device 30a are denoted by H and W, respectively. There is substantially no deviation in positions of pixels among the polarization images, and therefore the positions can be considered as the same sampling positions.

Iris image extractor 13 detects a pupil and an iris in each of polarization images L0C0, L0C45, L0C90, and L0C135, and thereby detects an iris region. For example, iris image extractor 13 may detect a contour of a pupil and a contour of an iris, and may determine a region between the contour of the iris and the contour of the pupil as an iris region. Further, iris image extractor 13 generates four kinds of rectangular images RECTβ by cutting out images of the doughnut-shaped iris regions extracted in the polarization images. Note that θ represents an azimuth angle of a polarization transmission axis corresponding to the polarization pixel of the polarization image. Thereby, four rectangular images RECT0, RECT45, RECT90, and RECT135 are generated. Rectangular images RECT0, RECT45, RECT90, and RECT135 respectively correspond to polarization images L0C0, L0C45, L0C90, and L0C135. The rectangular images each show the iris.

Periodic function approximator 14 carries out analysis of periodicity of brightness changes that are changes of pixel values of four pixels in substantially the same pixel positions in rectangular images RECT0, RECT45, RECT90, and RECT135, that is, corresponding four pixels. More specifically, a periodic function is a function with a pixel value of a polarization pixel and an azimuth angle of the polarization transmission axis as parameters. The azimuth angle of the polarization and transmission axis is expressed in phase. The periodic function is calculated as a periodic function that is closely analogous to a curve that passes through four coordinate points having coordinate components of pixel values and azimuth angles of polarization and transmission axes of respective corresponding four polarization images of the four rectangular images. Periodic function approximator 14 calculates periodic functions of the respective pixels of the rectangular image. Thereby, the periodic functions are generated for the respective pixel positions. Periodic function approximator 14 generates amplitude image A with pixel values in the respective pixel positions as amplitudes of the periodic function, phase image φ with the pixel values in the respective pixel positions as shift amounts in phase of the periodic function to a reference, and average image M with the pixel values in the respective pixel positions as an average value of the periodic function. The average value of the periodic function may be an average value of a maximum value and a minimum value of the periodic function. Amplitude image A, phase image φ and average image M are rectangular images having pixel arrays similar to the original rectangular images, and pixel positions also correspond to the pixel positions of the rectangular images. Details of the respective images will be described later.

As described above, corneal information and iris information are separated by separating amplitude image A, phase image φ, and average image M from the rectangular image. More specifically, a cornea shape and polarization optical characteristic are converted, that is, encoded as amplitude image A and phase image φ. Average image M is an image corresponding to a conventional iris image. Amplitude image A and phase image φ show corneal information, and average image M shows iris information.

Cornea authenticator 15 acquires amplitude image A and phase image φ that are corneal information, and carries out cornea authentication. More specifically, cornea authenticator 15 compares amplitude image A and phase image φ to a reference amplitude image and a reference phase image of each user stored in cornea authentication information DB 110, and determines a user ID, that is, identification information corresponding to amplitude image A and phase image φ based on, for example, similarity. For example, cornea authenticator 15 determines a reference amplitude image and a reference phase image having predetermined or higher degrees of similarity to amplitude image A and phase image φ, and identifies user ID associated with the determined reference amplitude image and reference phase image. The degree of similarity may be a distance between signals of the two images. Here, the reference amplitude image and reference phase image are examples of the cornea image.

Iris authenticator 16 acquires average image M that is iris information, and carries out iris authentication. More specifically, iris authenticator 16 compares average image M to a reference average image of each user that is stored in iris authentication information DB 120, and identifies a user ID corresponding to average image M based on, for example, similarity. For example, iris authenticator 16 determines reference average image having a predetermined or higher degree of similarity to average image M, and identifies a user ID associated with the determined reference average image. The degree of similarity may be a distance between signals of the two images. Here, the reference average image is an example of the iris image.

Integrator 17 acquires authentication results CRN and IRS from cornea authenticator 15 and iris authenticator 16, respectively, and outputs a final authentication result by integrating the acquired authentication results.

[Cornea Authentication Information DB 110]

Cornea authentication information DB 110 stores a reference amplitude image and a reference phase image in association with a user ID. The reference amplitude image and the reference phase image are an amplitude image and a phase image, respectively, that are acquired in advance using an eyeball image of each user taken in advance. Cornea authentication information DB 110 may have any of the configurations illustrated with respect to concerning storage 11. One user ID may be stored in association either with a single set of a reference amplitude image and a reference phase image or with a plurality of sets of reference amplitude images and reference phase images. Cornea authentication information DB 110 may be disposed either in a device in which authentication apparatus 100 is installed or outside the device. Cornea authentication information DB 110 disposed outside the above described device may exchange information with authentication apparatus 100 via wireless communication. In this case, cornea authentication information DB 110 may be disposed in a cloud server and the cloud server may communicate with authentication apparatus 100 via wireless communication on a communication network such as the Internet and perform any other wireless communication.

[Iris Authentication Information DB 120]

Iris authentication information DB 120 stores a reference average image in association with a user ID. The reference average image is an average image acquired in advance using an eyeball image of each user taken in advance. Iris authentication information DB 120 may have any of the configurations illustrated with respect to concerning storage 11. One user ID may be stored in association either with a single reference average image or with a plurality of reference average images. The reference average image is typically a conventional iris authentication pattern that is disclosed in Japanese Patent No. 3307936. Iris authentication information DB 120 may be disposed either in a device in which authentication apparatus 100 is installed or outside the device. Iris authentication information DB 120 disposed outside the above described device may exchange information with authentication apparatus 100 via wireless communication. In this case, iris authentication information DB 120 may be disposed in a cloud server, and the cloud server may communicate with authentication apparatus 100 via wireless communication on a communication network such as the Internet and perform any other wireless communication.

[Output Section 130]

Output section 130 outputs an authentication result acquired by integrator 17 to a device or the like outside authentication system 1. Output section 130 may output the authentication result visually and/or auditorily to a display device such as a display and a speaker. Output section 130 may output the authentication result to an external device via wireless communication. When a user ID is identified by integrator 17, output section 130 may output information indicating the user, and when user ID is not identified, output section 130 may output information indicating that authentication is impossible. Output section 130 may have any of the configurations illustrated with respect to the components of processor 10. Output section 130 may be an interface for connecting to an external apparatus and the like. Output section 130 may be disposed either in a device in which authentication apparatus 100 is installed or in another device.

In the present embodiment, a control section (not illustrated) of polarization imaging device 30a of camera 30, and processor 10 are on separate processors, but may be on a single processor.

[1-2. Polarization Optical Effect of Cornea]

Figure 5A:
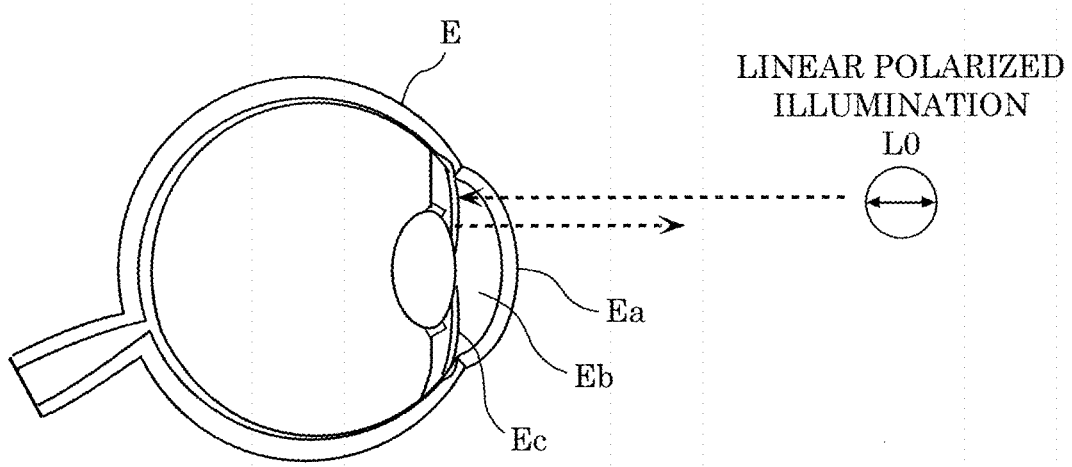
FIG. 5A is a schematic view explaining a birefringence phenomenon in a cornea, and schematically illustrating a situation in which linear polarized illumination is incident on and is reflected from the cornea.
Figure 5B:
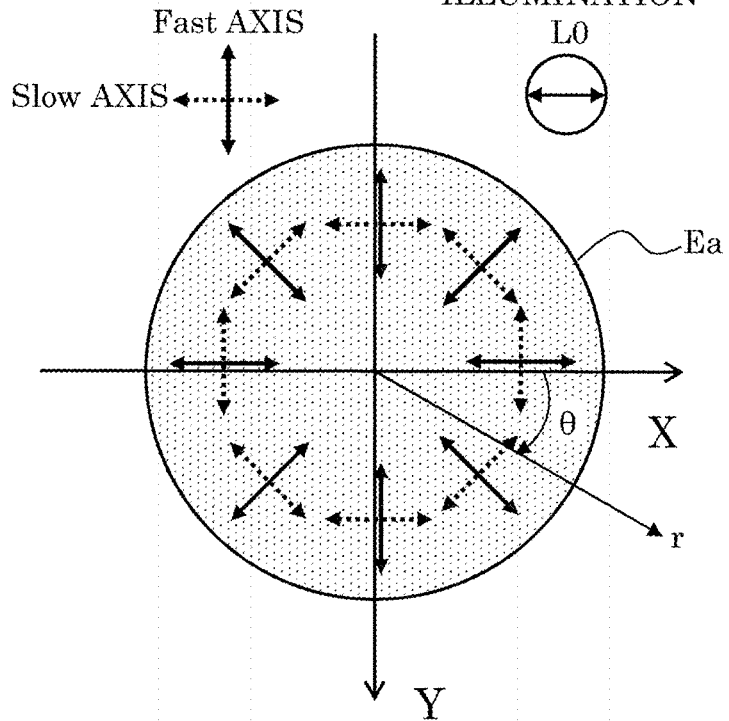
FIG. 5B is a view explaining the birefringence phenomenon in the cornea, and is a front view schematically illustrating linear polarized illumination incident on the cornea.
Figure 5C:
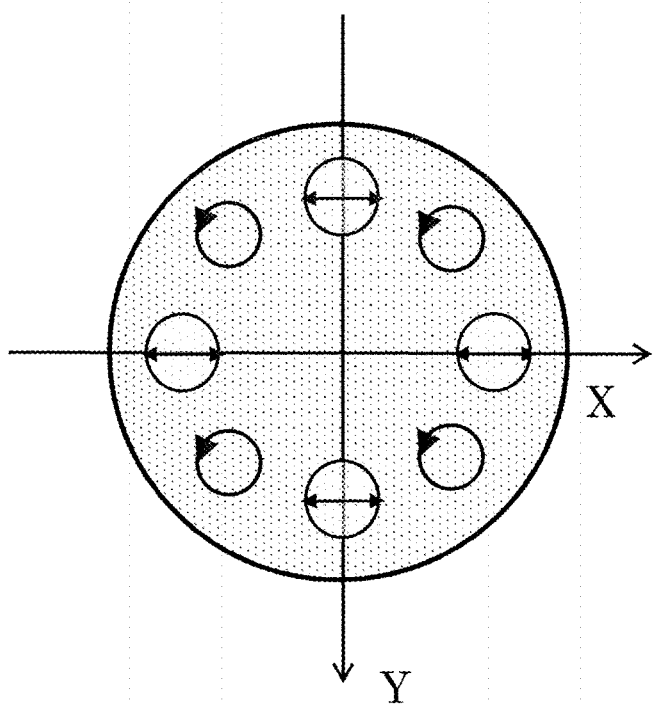
FIG. 5C is a view explaining the birefringence phenomenon in the cornea, and is a front view schematically illustrating linear polarized illumination reflected from the cornea.

Here, with reference to FIG. 5A to FIG. 5C, a polarization optical effect of a cornea of a human eye will be described. Note that FIG. 5A is a view explaining the polarization optical effect of a cornea, and is a view schematically illustrating a situation where linear polarized illumination is incident on and is reflected from a cornea. FIG. 5B is a view explaining the polarization optical effect of the cornea, and is a front view schematically illustrating linear polarized illumination that is incident on the cornea. FIG. 5C is a view explaining the polarization optical effect of the cornea, and is a front view schematically illustrating linear polarized illumination reflected from the cornea.

According to "Analysis of polarization characteristic in the living human eye" (written by Ichihashi Yuichi, Kawabata Shuichi, Ishikawa Kazuo, and Hatada Toyohiko, Journal of Ophthalmological Optics Society of Japan, 1989, Vol. 10, No. 1, pp. 87-92), a cornea of an eyeball has different refractive indices in a γ direction and a θ direction in a polar coordinate system as seen from the front. Note that the γ direction is a radial direction from a center of a cornea, and the θ direction is a rotational direction around the center of the cornea. A structural material of the cornea is called a birefringent material. When linear polarized light is incident on the birefringent material, the linear polarized light passes through the birefringent material while vibrating in two vibration directions. Light travels at different velocities in the two vibration directions during passing through the birefringent material, so that a shift occurs between the phases of the vibration in the two vibration directions, and the linear polarized light may change to elliptical polarized light or circular polarized light. Note that in the specification and the claims, circular polarized light and elliptical polarized light may be collectively referred to either as "circular polarized light" or as "elliptical polarized light". Therefore, "circular polarized light" and "elliptical polarized light" can both include circular polarized light and elliptical polarized light.

As illustrated in FIG. 5A, when linear polarized light L0 in a polarizing direction of 0° is incident on cornea Ea from directly above, that is, the front of the cornea Ea of eyeball E, a part of linear polarized light L0 is reflected from the interface between air and cornea Ea, and the rest of linear polarized light L0 passes through transparent cornea Ea and aqueous humor Eb, and reaches non-transparent iris Ec, from which the linear polarized light L0 is reflected back. The reflection light passes through aqueous humor Eb and cornea Ea again and then is emitted into the air to reach camera 30. In the process of the linear polarized light passing through the cornea twice, the phase of light in the two vibration directions of the linear polarized light shifts from each other in the γ direction and θ direction, linear polarized light L0 changes into elliptical polarized light before reaching camera 30. Note that linear polarized light L0 is linear polarized light having a vibration plane expanding in the direction of 0° that is a horizontal plane orthogonal to the plane of the drawing and including the broken line.

FIG. 5B illustrates distribution of birefringence in a plane with an F (Fast) axis and an S (Slow) axis as cornea Ea is seen from the front. The Fast axis is also called a phase advance axis, and is an axis for an azimuth in which light travels faster, that is, the phase is ahead. The Slow axis is also called a phase retardation axis, and is an axis of an azimuth in which light travels slower, that is, the phase is behind. The Fast axis and Slow axis are orthogonal to each other. In FIG. 5B, setting of the axis in the γ direction being the Fast axis, and the axis in the θ direction being the Slow axis is assumed. Considering FIG. 5B using an orthogonal coordinate system of an X axis and a Y axis, only the directions of the X axis corresponding to θ=0° and θ=180°, and the directions of the Y axis corresponding to θ=90° and θ=270° are special directions. At this time, one of the F axis and S axis corresponds to one of the Y axis and X axis, and the other one of the F axis and S axis corresponds to the other one of the Y axis and X axis.

FIG. 5C illustrates distribution of the state of polarized light reaching camera 30 in the front of cornea Ea, with an effect of birefringence taken into consideration. FIG. 5C shows influence on linear polarized light L0 in the polarization direction of 0° which is incident on cornea Ea due to the distribution in the plane with the F axis and S axis described above. When the directions of the F axis and S axis are directions of the X axis and Y axis, only a phase shift occurs to linear polarized light L0, and incident linear polarized light L0 is reflected and returns in the same polarization state, even when a phase shift of light occurs in the two vibration directions. When the directions of the F axis and S axis are directions at angles to be off the X axis and Y axis, a phase difference occurs between light in the X axis direction and light in the Y axis direction which result from decomposition of linear polarized light L0 in vibration directions, so that a composite result of these light form an elliptical polarized light. FIG. 5C particularly illustrates a state in which linear polarized light L0 changes to an elliptical polarized light when the F axis and S axis form 45 degrees with the X axis and Y axis. In this case, the phase shift of the light between the two vibration directions is maximum.

FIG. 6 is a view schematically illustrating general image patterns shown in an image taken by camera 30 with the polarization optical effect of the cornea described above. In the case where an image is taken by camera 30 when linear polarized light of illuminating light having a light amount of 1 is reflected from an eyeball to directly return as linear polarized light and camera 30 is a polarization camera capable of imaging a polarization state, the brightness of polarization pixel corresponding to the polarizing filter ideally amounts to zero in an orthogonal polarization state in which the polarizing directions of the illuminating light and the polarizing filter of camera 30 are orthogonal to each other. Further, in a parallel polarization state in which the polarizing directions of the illuminating light and the polarizing filter are parallel, the brightness of the polarization pixel corresponding to the polarizing filter ideally amounts to one. However, when the linear polarized light having a light amount of 1 returns as circular polarized light, the brightness of the polarization pixel is ½ whether the polarization directions of the illuminating light and the polarizing filter are parallel or orthogonal. Consequently, when the distribution of the polarization state in a two-dimensional plane as the cornea is seen from the front is uneven, the distribution of the polarization state appears as a brightness pattern of light and shade in the image taken by camera 30.

Four kinds of polarization images composed of polarization pixels C0, C45, C90, and C135 are generated from the image. In an example shown in FIG. 6, illuminating light is linear polarized light L0, and therefore a combination of linear polarized light L0L0 and polarization pixel C0 corresponds to parallel polarized light, and a combination of linear polarized light L0 and polarization pixel C90 corresponds to orthogonal polarized light. In the present specification, for example, a polarization state obtained by combining an illuminating light in polarizing direction p which is observed and a polarization state in polarizing direction q at an observation side of polarization imaging device 30$a$ or the like is denoted by LpCq. Further, coordinate systems of angles, that is, azimuth angles are all camera coordinate systems with an image that is taken by the camera as a reference. As illustrated in FIG. 7, in the camera coordinate system, a positive direction of an X axis is rightward in the horizontal direction on the image, when the image is seen in an image pickup direction of the camera, and a positive direction of a Y axis is downward in the vertical direction. An angle, that is, an azimuth angle is zero in the positive direction of the X axis, and the rotation direction increases from zero toward the positive direction of the Y axis. Note that FIG. 7 is a schematic view illustrating an example of the camera coordinate system in an image of an eye, and is a view in which a center of a cornea is set as the origin.

Patterns that are observed will be specifically described. In a case of orthogonal polarization state L0C90, pixels on the X axis and Y axis show an image of linear polarized light that has returned as linear polarized light, so that ideally, the pixels have a brightness of 0 and become dark. However, pixels on axes oblique to the X axis and Y axis show an image of circular polarized light, and therefore become gray at a brightness of ½. Thereby, on the image of the eye, a so-called "dark cross" pattern appears as illustrated in the image L0C90 in FIG. 6. Further, in a case of parallel polarization state L0C0, the pixels on the X axis and Y axis show an image of linear polarized light that has returned as linear polarized light, and therefore become bright at a brightness of 1, but the other pixels, which are on the oblique axes, have a brightness of ½ and become slightly dark gray. That is, a light and dark pattern appears on the image of the eye. In polarization states L0C45 and L0C135 other than the above described states, different patterns appear as illustrated in FIG. 6 in which dark spots are located in different directions. In the present specification, the patterns due to birefringence of the cornea as described above are referred to as "birefringent pattern".

FIG. 8 illustrates four kinds of polarization images photographed in an experiment, and the images correspond to the schematic views of the respective images illustrated in FIG. 6. Each of the four polarization images show a different birefringent pattern of cornea appearing on an iris. Further, as another feature, in polarization image L0C0 corresponding to the parallel polarization state, the brightness contrast between the iris and a white of the eye is high. Conversely, in polarization image L0C90 corresponding to the orthogonal polarization state, mirror reflection of the illuminating light form the cornea is weaker, and the brightness contrast between the iris and the white of the eye is so lower that the region of the iris and the region of the white of the eye is a substantially continuous region.

[1-3. Operation of Authentication System 1]

Figure 9:
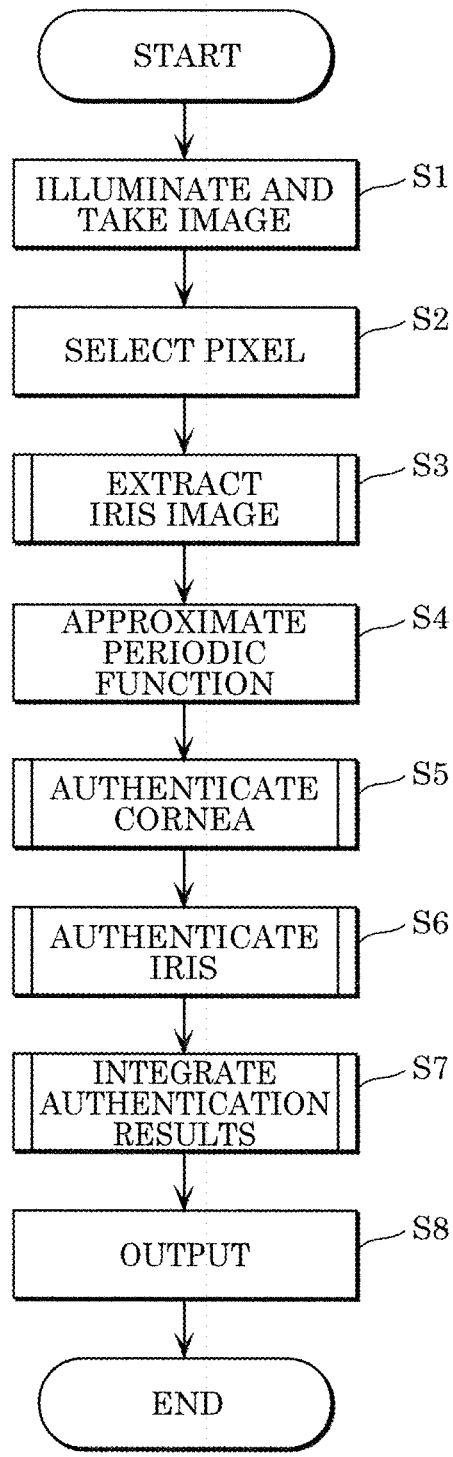
FIG. 9 is a flowchart illustrating an example of an operation of the authentication system according to embodiment 1.

An operation of authentication system 1 will be described with reference to FIG. 9. Note that FIG. 9 is a flowchart illustrating an example of the operation of authentication system 1 according to embodiment 1. First, in step S1, illumination device 20 emits linear polarized light L0 in polarizing direction of 0° toward a person in front who is an object of authentication. During illumination device 20 emits the light, camera 30 takes images of the object in front. Camera 30 stores the images in storage 11. The images are eyeball images each including an image of an eye of the person taken from outside. Each of the images includes information on the shooting time. The operations of illumination device 20 and camera 30 thus interlocked may be controlled by a control device (not illustrated) included in illumination device 20 or camera 30, may be controlled by processor 10, or may be controlled by a control device (not illustrated) of authentication apparatus 100 or authentication system 1. Alternatively, illumination device 20 and camera 30 may be set to perform illumination using linear polarized light L0 and image shooting, at intervals of a predetermined time.

Next, in step S2, pixel selector 12 of processor 10 acquires the images from storage 11, and selects pixels from each of the images. More specifically, pixel selector 12 extracts, from each of the images, polarization pixels C0, C45, C90, and C135 that are acquired by the light receiving elements corresponding to respective linear polarizing filters 30$aca$ to 30$acd$ with the azimuth angles of the polarization transmission axes of 0°, 45°, 90°, and 135° in polarization imaging device 30$a$ of camera 30. Pixel selector 12 generates polarization images L0C0, L0C45, L0C90, and L0C135 that are four new images by reintegrating polarization pixels C0, C45, C90, and C135 which have been extracted. Each of the polarization images includes information on the polarization pixels that form the polarization image.

Next, in step S3, iris image extractor 13 of processor 10 detects a pupil and an iris in each of polarization images L0C0, L0C45, L0C90, and L0C135, and thereby extracts an image of an iris region. Further, iris image extractor 13 develops the four doughnut-shaped images corresponding to the iris region into rectangles, and converts the four images into rectangular images RECT0, RECT45, RECT90, and RECT135. Details of a process of step S3 will be described later.

Next, in step S4, periodic function approximator 14 of processor 10 calculates, that is, approximates a periodic function using the four rectangular images RECT0, RECT45, RECT90 and RECT135. Periodic function approximator 14 calculates the periodic function by using four pixels positions of which correspond to one another among the four rectangular images. The periodic function is calculated with respect to respective pixel positions of the rectangular images. Further, periodic function approximator 14 generates amplitude image A, phase image φ, and average image M respectively having an amplitude, a phase shift, and an average value of the periodic function of each of the pixel positions as pixel values, and outputs amplitude image A, phase image φ, and average image M to cornea authenticator 15 and iris authenticator 16.

Next, in step S5, cornea authenticator 15 compares amplitude image A and phase image φ, with the reference amplitude images and the reference phase images of the respective users that are stored in cornea authentication information DB 110, and identifies a user ID corresponding to amplitude image A and phase image φ. Cornea authenticator 15 outputs the identification result to integrator 17. Details of a process in step S5 will be described later.

Next, in step S6, iris authenticator 16 compares average image M with the reference average images of the respective users that are stored in iris authentication information DB 120, and identifies a user ID corresponding to average image M. Iris authenticator 16 outputs the identification result to integrator 17. Details of a process of step S6 will be described later.

Next, in step S7, integrator 17 outputs a final authentication result by integrating authentication results that are acquired from cornea authenticator 15 and iris authenticator 16. Integrator 17 determines propriety of the authentication result, and identifies an owner of the eye in the image taken in step S1. Integrator 17 outputs a determination result to output section 13. Details of a process of step S7 will be described later.

Subsequently, in step S8, output section 130 outputs information concerning the owner identified based on the determination result of integrator 17 to an external device such as a display device. When no owner is identified, output section 130 outputs information indicating authentication failure to the external device. Output section 130 may acquire information concerning the owner corresponding to user ID by accessing another database not illustrated.

[1-3-1. Details of Process in Step S3]

Figure 10:
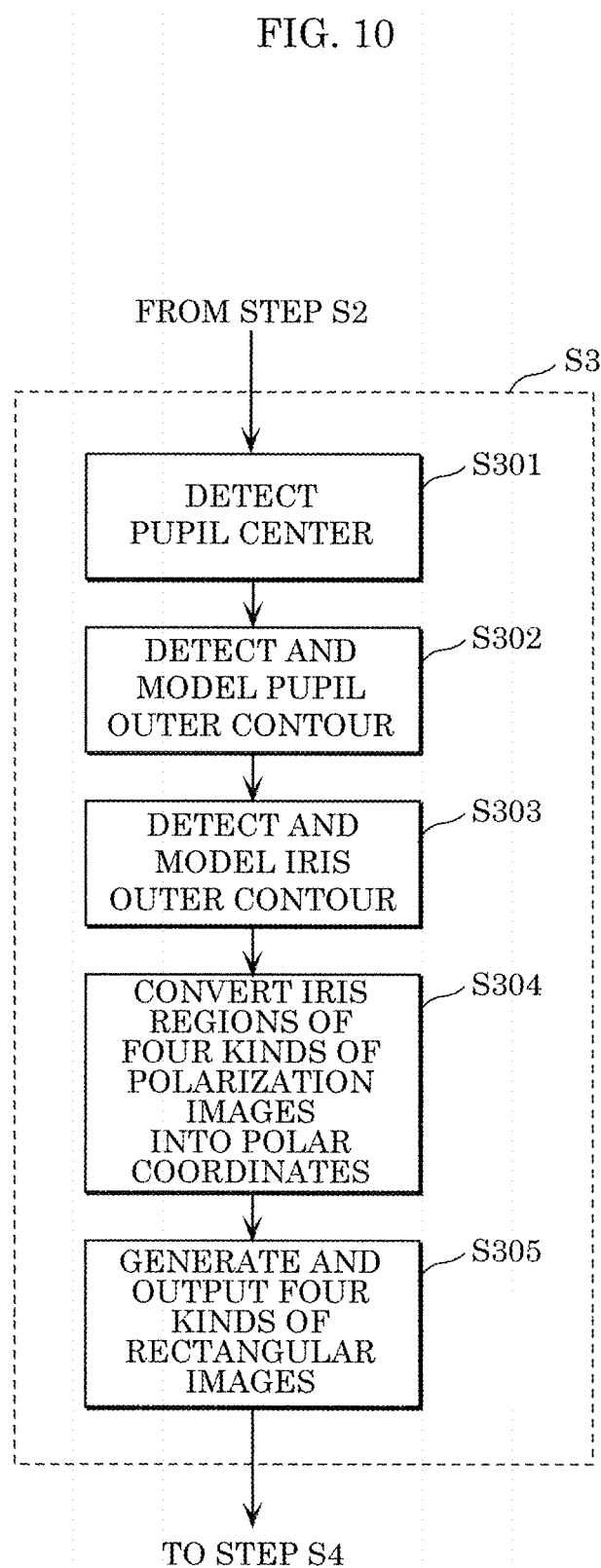
FIG. 10 is a flowchart illustrating an example of an iris image extraction process by an iris image extractor.

Details of the process in step S3 will be described. FIG. 10 is a flowchart illustrating one example of an iris image extraction process by iris image extractor 13. As illustrated in FIG. 10, iris image extractor 13 detects a center of a pupil to be a reference of modeling shown as follows in each of polarization images L0C0, L0C45, L0C90, and L0C135 in step S301. In detection of the center of the pupil, image processing may be used in which a detection method is performed with attention to, for example, the brightness and shape of a pupil that is a darkest circular region in the image, or detection of a circle of a bright ring-shaped illumination image reflected on a dark pupil.

In step S302, iris image extractor 13 detects outer contours of the pupils in the respective polarization images described above. Further, iris image extractor 13 models the detected outer contours by using distance from the center of the pupil. In detection and modeling of the outer contours of the pupil, iris image extractor 13 observes change in brightness along a radius vector direction from the center of the pupil, and finds a spot having an abrupt change in brightness from a dark region corresponding to the pupil region to a bright region corresponding to the iris region to determine the spot as a candidate of the outer contour of the pupil. Iris image extractor 13 carries out calculation of such a candidate at a plurality of sampled angles, that is, a plurality of azimuth angles from the center of the pupil. Iris image extractor 13 connects a plurality of points determined as the candidates with a continuous curve, and uses the continuous curve formed thereby to model the outer contours of the pupil. The modeling may be performed using, for example, a method for expressing the distance in the polar coordinates by a polynomial expression, or a method of ellipse approximation.

Next, in step S303, iris image extractor 13 detects the outer contour of the iris, and models the outer contour of the iris. The present process is basically similar to the process in step S302. Iris image extractor 13 observes change in brightness along a radius vector direction from the pupil center, finds a spot having an abrupt change in brightness from a dark region corresponding to the iris region to a bright region corresponding to the region of the white of the eye to determine the spot as an outer contour candidate of the iris. Iris image extractor 13 carries out calculation of such a candidate at a plurality of azimuth angles which are sampled, and models the outer contour of the iris by using a continuous curve that is determined from the plurality of points determined as the candidate.

Next, in step S304, iris image extractor 13 extracts the iris regions of the eye regions of the four polarization images by using the pupil center, the pupil outer contour model, and the iris outer contour model obtained in steps S301 to S303. Further, iris image extractor 13 converts images of the iris regions of the polarization images into polar coordinates.

Next, in step S305, iris image extractor 13 develops the images of the four iris regions after polar coordinate conversion into rectangles, generates rectangle images RECT0, RECT45, RECT90, and RECT135, and outputs rectangle images RECT0, RECT45, RECT90, and RECT135.

In the aforementioned iris image extraction process, the four polarization images are used, and pixel positions of the respective pixels are associated with one another among the four polarization images. However, when detection and modeling of the outer contours and the like are carried out separately without the four polarization images being associated with one another, pixel positions of the outer contours that are modeled deviate from one another among the four images. Consequently, the processes of detection and modeling in step S301 to S303 are performed by using only specific polarization images suitable for these processes, and in the processes in steps S304 and S305, the results in step S301 to S303 are desirably used in common.

Figure 11:
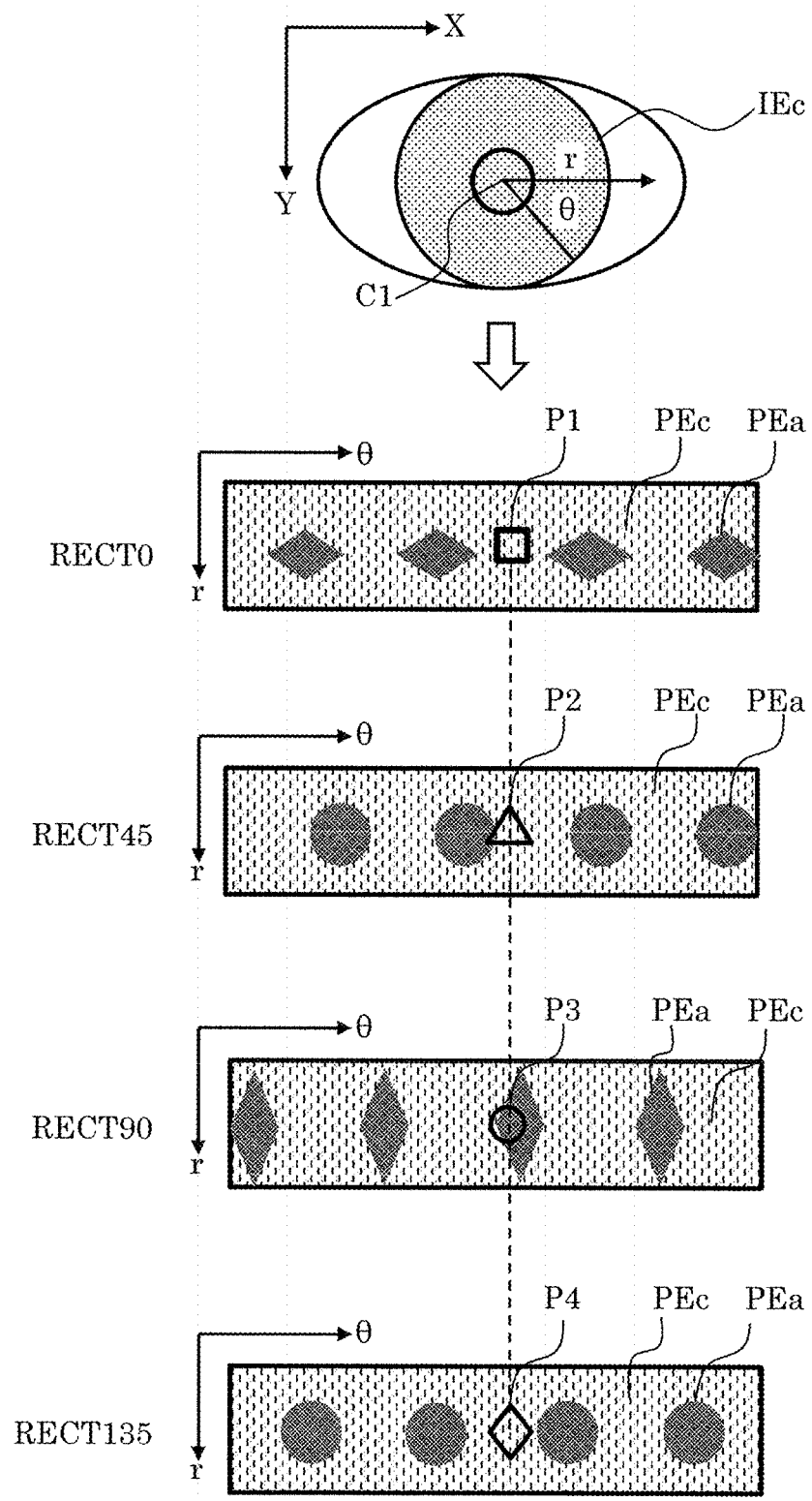
FIG. 11 is a diagram explaining an example of details of a development process of an iris image by the iris image extractor.

Further, details of the processes in S304 and S305 will be described. FIG. 11 is a diagram explaining an example of details of a development process of an iris image by iris image extractor 13. As illustrated in FIG. 11, iris image extractor 13 converts image IEc of the iris region into polar coordinates ($\gamma$, $\theta$) with pupil center C1 as an origin. Element $\gamma$ is a distance from origin C1, and element $\theta$ is a rotation angle with origin C1 as a center. Iris image extractor 13 performs a rectangular developing process to develop, in a $\theta$ direction, images IEc of iris regions of polarization images L0C0, L0C45, L0C90, and L0C135, and generate rectangular images RECT0, RECT45, RECT90, and RECT135. In each of the rectangular images, a vertical axis is a $\gamma$ axis, and a horizontal axis is a 0 axis. Further, an iris pattern PEc and a pattern according to the polarization optical characteristic of the cornea, that is, birefringence pattern PEa are superimposed on each of the rectangular images.

[1-3-2. Details of Process in Step S4]

Figure 12:
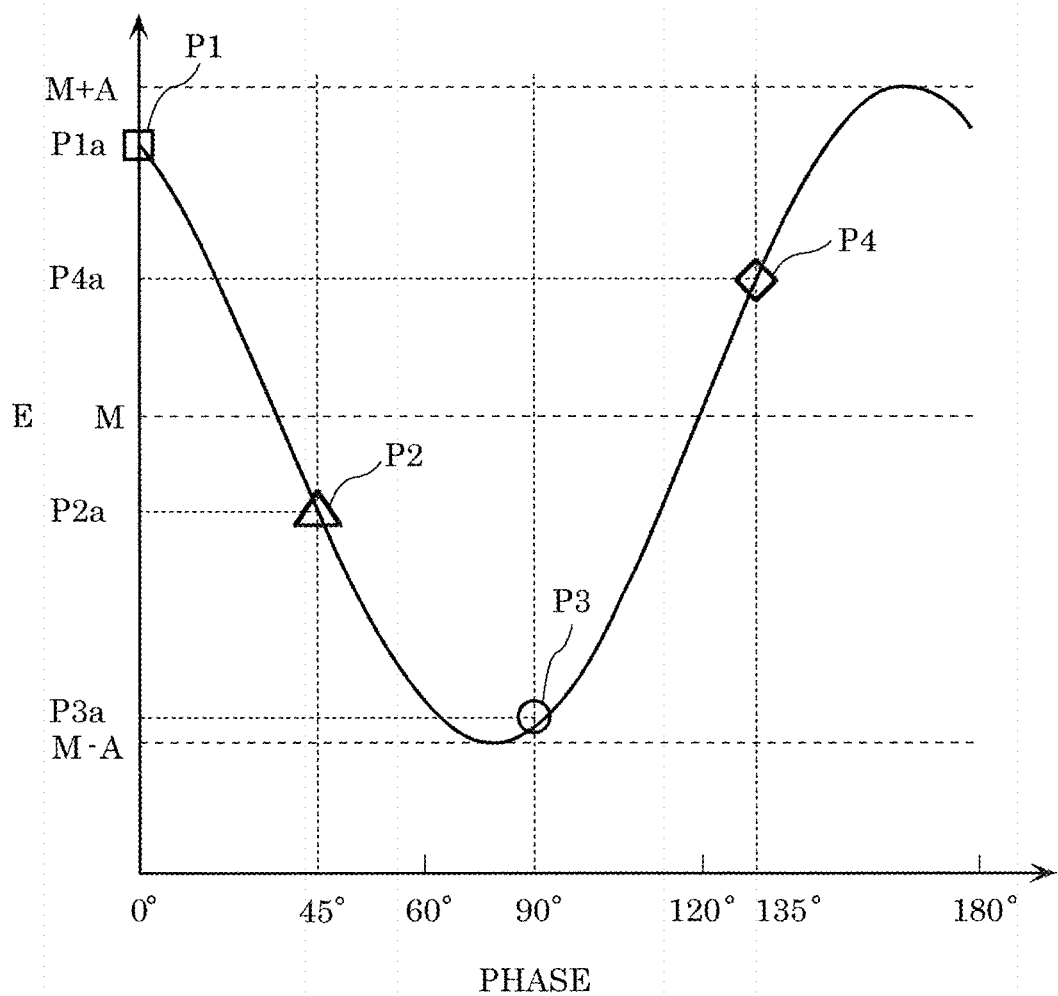
FIG. 12 is a diagram explaining an example of details of a calculation process of a periodic function by a periodic function approximator.

Further, with reference to FIG. 11 and FIG. 12, details of the periodic function approximation process by periodic function approximator 14 in step S4 will be described. FIG. 12 is a diagram explaining an example of details of a calculation process of a periodic function by periodic function approximator 14. Making use of periodicity of birefringence pattern PEa of the cornea in the $\theta$-axis direction of the rectangular image as can be seen in FIG. 11, periodic function approximator 14 performs fitting of four brightness periodic functions individually for all the pixel positions of the rectangular image. More specifically, periodic function approximator 14 extracts corresponding pixels P1, P2, P3, and P4 that are in substantially the same pixel positions, from respective rectangular images RECT0, RECT45, RECT90, and RECT135. Periodic function approximator 14 acquires brightness values that are pixel values of the respective corresponding pixels. For example, brightness values of respective corresponding pixels P1, P2, P3, and P4 are P1a, P2a, P3a, and P4a. Further, azimuth angles of polarization transmission axes of the corresponding pixels P1, P2, P3, and P4 that are polarization pixels are respectively 0°, 45°, 90°, and 135° respectively. Periodic function approximator 14 calculates a periodic function approximated to be a curve passing through four coordinate points of corresponding pixels P1, P2, P3, and P4, in an orthogonal coordinate system components of which components are the pixel values and the azimuth angles of the polarization transmission axis. Periodic function approximator 14 calculates periodic functions as described above with respect to all the pixel positions of the rectangular images.

As illustrated in FIG. 12, periodic function approximator 14 fits, for example, four coordinate points of corresponding pixels P1, P2, P3, and P4 to a sine function. Periodic function approximator 14 calculates a sine function closest to the four coordinate points and determines the sine function as a periodic function. Note that the approximation method of the periodic function is not limited to the above described fitting but may be any known method.

Thereby, periodic function approximator 14 calculates a periodic function as shown in expression 1 as follows. A periodic function as expression 1 is calculated with respect to each of the pixel positions of the rectangular image. By using such a periodic function, three parameters of amplitude A, phase φ, and average value M are estimated with respect to each of the pixel positions. Periodic function approximator 14 generates an amplitude image having amplitude A of the periodic function in each of the pixel positions as a pixel value of the pixel position. Periodic function approximator 14 generates a phase image with phase φ of the periodic function in each of the pixel positions as the pixel value of the pixel position. Phase φ is a shift of a phase in the 0 axis direction that is an azimuth angle. Further, periodic function approximator 14 generates an average image that has average value M of the periodic function in each of the pixel positions as the pixel value of the pixel position. Average value M is a deviation in a Value axis direction that is a pixel value. By the process like this, the four rectangular images are converted into the three images of the same size, amplitude images, phase images, and average images.

[Math. 1]

$$\text{Value} = M + A \cdot \sin(2(\theta - \Phi)) \quad \text{Expression 1}$$

Figure 13:
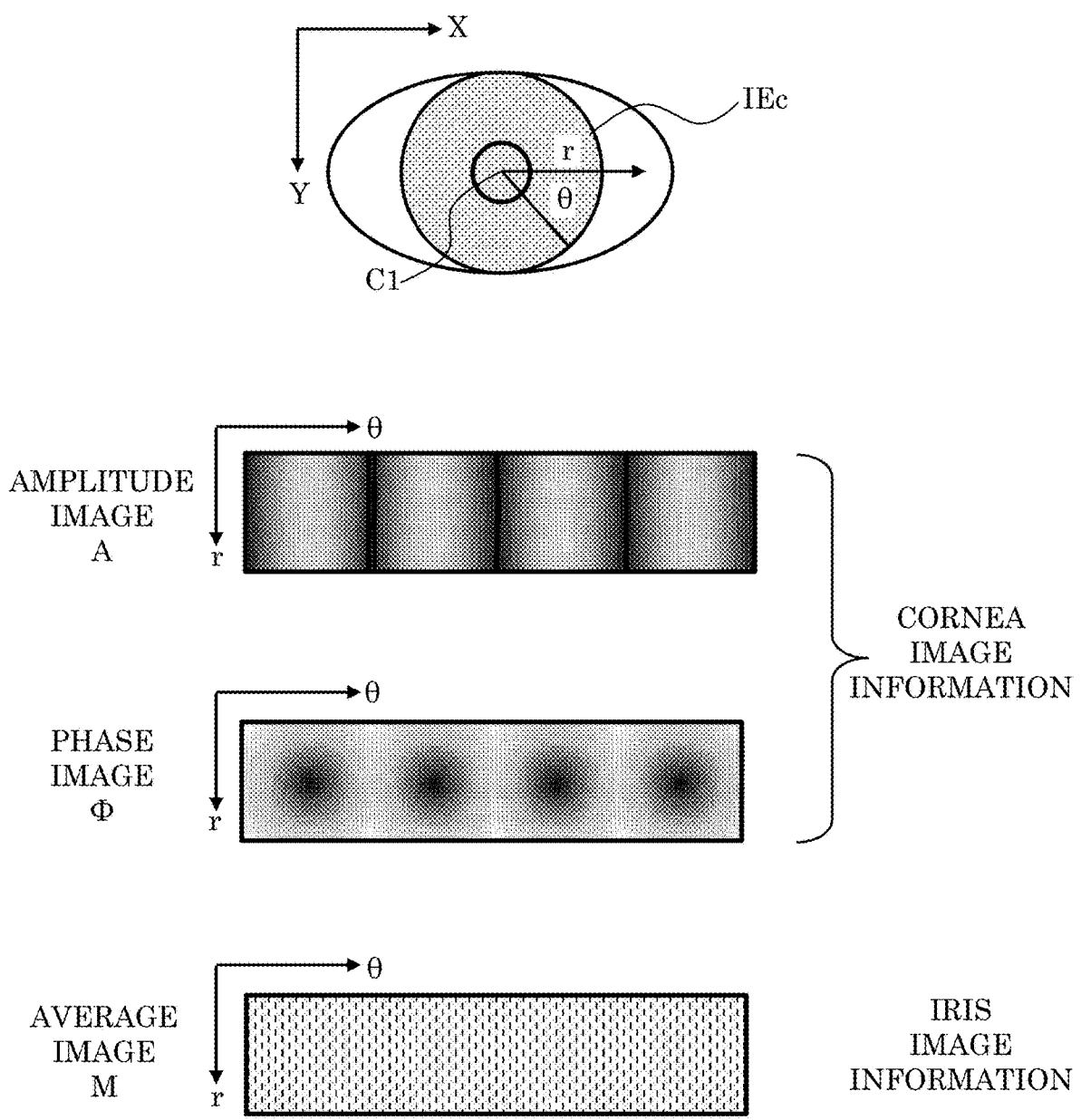
FIG. 13 is diagram illustrating examples of an amplitude image, a phase image, and an average image that are outputted from the periodic function approximator.

Further, FIG. 13 is a diagram illustrating examples of amplitude image A, phase image φ, and average image M outputted from periodic function approximator 14. Amplitude image A and phase image φ among these images correspond to cornea image information, and average image M corresponds to iris image information. In this way, image IEc of the iris region which is an eyeball image is separated into cornea information and iris information.

Figure 14A:
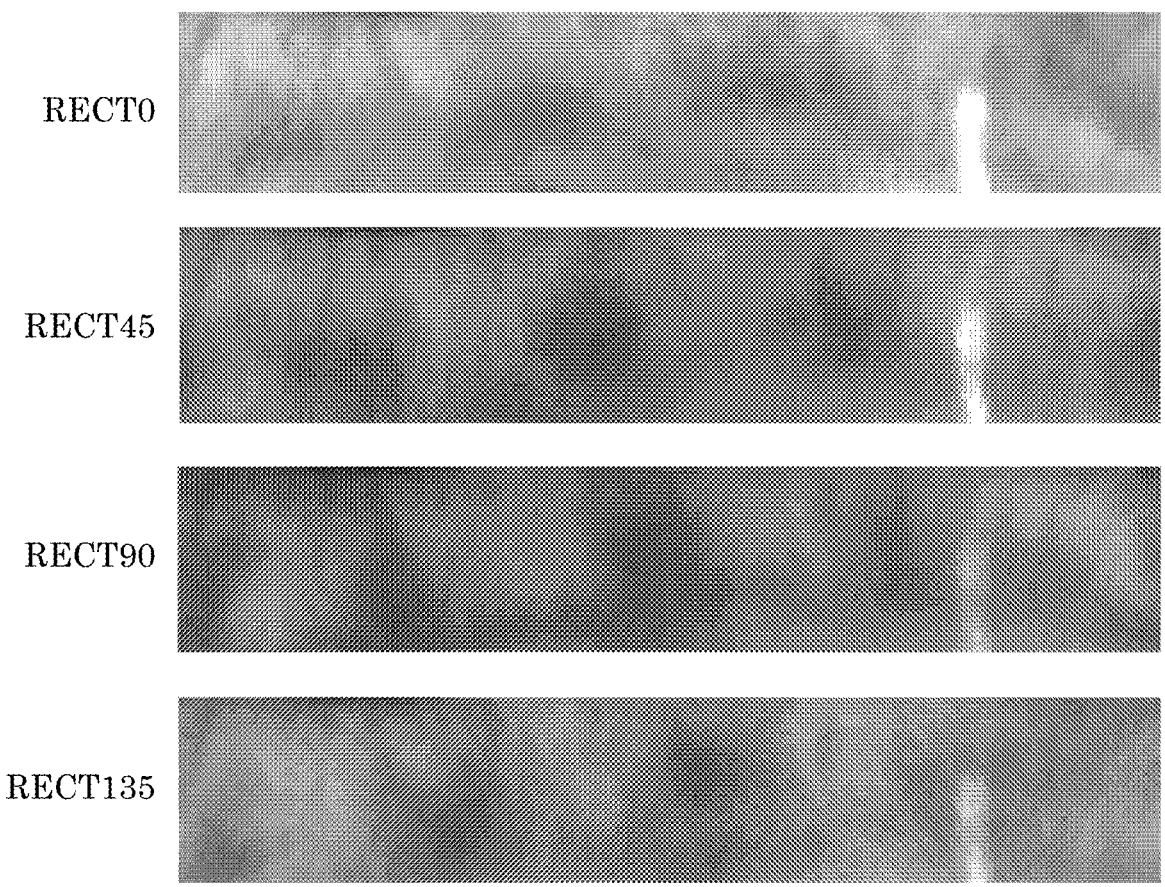
FIG. 14A is a view illustrating actual image examples of four rectangular images that are generated from four polarization images of an iris.
Figure 14B:
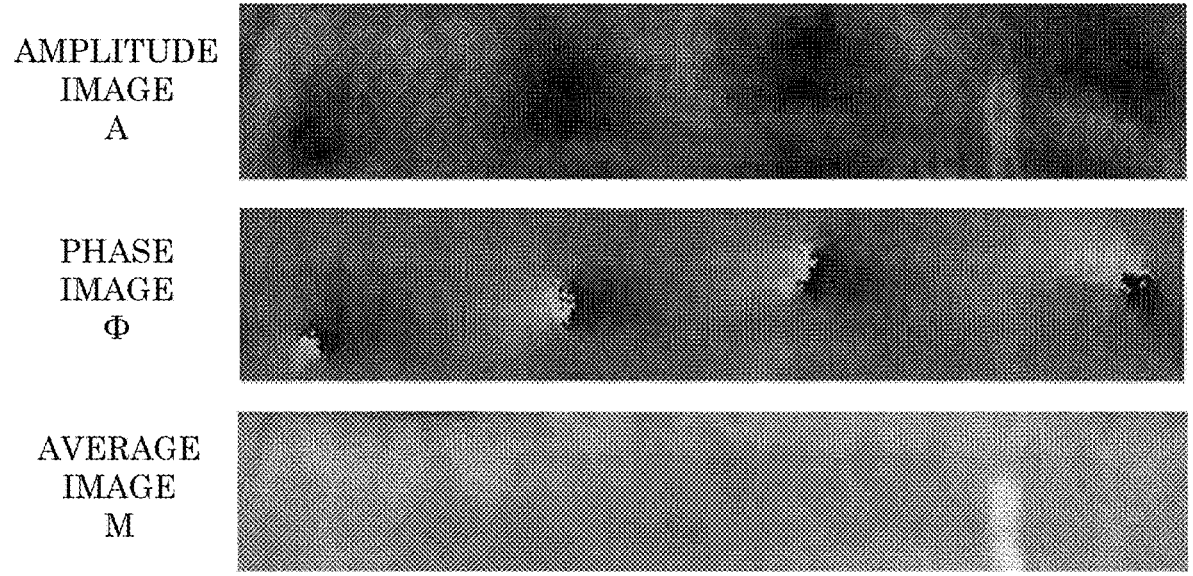
FIG. 14B is a view illustrating actual image examples of an amplitude image, a phase image, and an average image that are generated by the periodic function approximator from the four rectangular images in FIG. 14A.

FIG. 14A illustrates actual image examples of the four rectangular images RECT0, RECT45, RECT90, and RECT135 generated from the four polarization images L0C0, L0C45, L0C90, and L0C135 of the iris illustrated in FIG. 8. FIG. 14B illustrates actual image examples of amplitude image A, phase image φ, and average image M generated by periodic function approximator 14 from four rectangular images RECT0, RECT45, RECT90, and RECT135 in FIG. 14A. Phase image φ is originally a periodic function, but is encoded into black to white in FIG. 14B.

[1-3-3. Details of Process in Step S5]

With reference to FIG. 15, details of the process in step S5 will be described. FIG. 15 is a flowchart illustrating an example of the details of the cornea authentication process by cornea authenticator 15. First, in step S501, cornea authenticator 15 generates, using expression 2 as follows, a vector image V(XI, YI) of a cornea having two components from amplitude image A and phase image φ generated from an image taken by camera 30. Cornea vector image V is calculated by using amplitude values and phases of the corresponding pixels in the substantially same pixel positions in amplitude image A and phase image φ. Hereinafter, cornea vector image V will be also referred to as "cornea vector image V for authentication".

[Math. 2]

$$\begin{cases} XI = A \cdot \cos\Phi \\ YI = A \cdot \sin\Phi \end{cases} \quad \text{Expression 2}$$

Next, in step S502, cornea authenticator 15 acquires cornea authentication information that is accumulated in advance from cornea authentication information DB 110. In cornea authentication information DB 110, a plurality of individuals are registered, and cornea information of respective individuals is accumulated as cornea authentication information. Cornea information of the respective individuals includes amplitude images AR and phase image φR of the respective individuals. Amplitude images AR and phase images φR of the respective individuals are created in advance in a method similar to the method described above concerning amplitude image A and phase image φ of the image taken by camera 30, and are stored in cornea authentication information DB 110 where Amplitude images AR and phase images φR of the respective individuals are in association with user IDs of the respective individuals.

Next, in step S503, cornea authenticator 15 also generates cornea vector image VR (XR, YR) based on expression 2 described above, with respect to amplitude image AR and phase image φR of the cornea authentication information. Note that cornea vector images of cornea authentication information may be accumulated in cornea authentication information DB 110. Hereinafter, cornea vector image VR will be also referred to as "reference cornea vector image VR".

Next, in step S504, cornea authenticator 15 obtains distance COR_DIST between cornea vector image V for authentication generated from the image taken by camera 30 and reference cornea vector image VR generated from the cornea authentication information in a norm of a distance between signals as in expression 3 as follows. Cornea authenticator 15 outputs distances between cornea vector image V for authentication and various reference cornea vector images VR to integrator 17 as authentication results. In this way, cornea authenticator 15 calculates a distance of the cornea vector image between the image and the cornea authentication information, which is the cornea authentication process.

[Math. 3]

$$COR\_DIST = \|V - VR\|  \qquad \text{Expression 3}$$

[1-3-4. Details of Process in Step S6]

With reference to FIG. 16, details of the process in step S6 will be described. Note that FIG. 16 is a flowchart illustrating an example of the details of the iris authentication process by iris authenticator 16. First, in step S601, iris authenticator 16 carries out Gabor filtering on average image M generated from the image taken by camera 30, and generates a real part image and an imaginary part image. A generation method of the real part image and the imaginary part image is known, and therefore explanation of the generation method will be omitted.

Next, in step S602, iris authenticator 16 generates real part IR and imaginary part II as iris authentication data by binarizing the real part image and the imaginary part image using a threshold. Hereinafter, real part IR and imaginary part II will be also referred to as "real part IR for authentication and imaginary part II for authentication".

Next, in step S603, iris authenticator 16 acquires the iris authentication information that is accumulated in advance from iris authentication information DB 120. In iris authentication information DB 120, a plurality of individuals are registered, and iris information of the respective individuals is accumulated as the iris authentication information. The iris information of the respective individuals is real parts IRR and imaginary parts IIR concerning eyeball images of the respective individuals. Real parts IRR and imaginary parts IIR of the respective individuals are created in advance by a method similar to the method described above concerning real part IR and imaginary part II about the image taken by camera 30, and are stored in iris authentication information DB 120 where real part IR and imaginary part II are in association with user IDs of the respective individuals. Hereinafter, real part IRR and imaginary part IIR of the iris authentication information will be also referred to as "reference real part IRR and reference imaginary part IIR".

Next, in step S604, iris authenticator 16 calculates Hamming distance IRIS_DIST between real part IR for authentication and imaginary part II for authentication, and reference real part IRR and reference imaginary part IIR. Iris authenticator 16 outputs Hamming distances between real part IR for authentication and imaginary part II for authentication, and various reference real parts IRR and reference imaginary parts IIR to integrator 17 as authentication results. In this way, iris authenticator 16 calculates a distance between the real part and the imaginary part between the image taken by camera 30 and the iris authentication information, which is the iris authentication process.

[1-3-5. Details of Process of Step S7]

Figure 17:
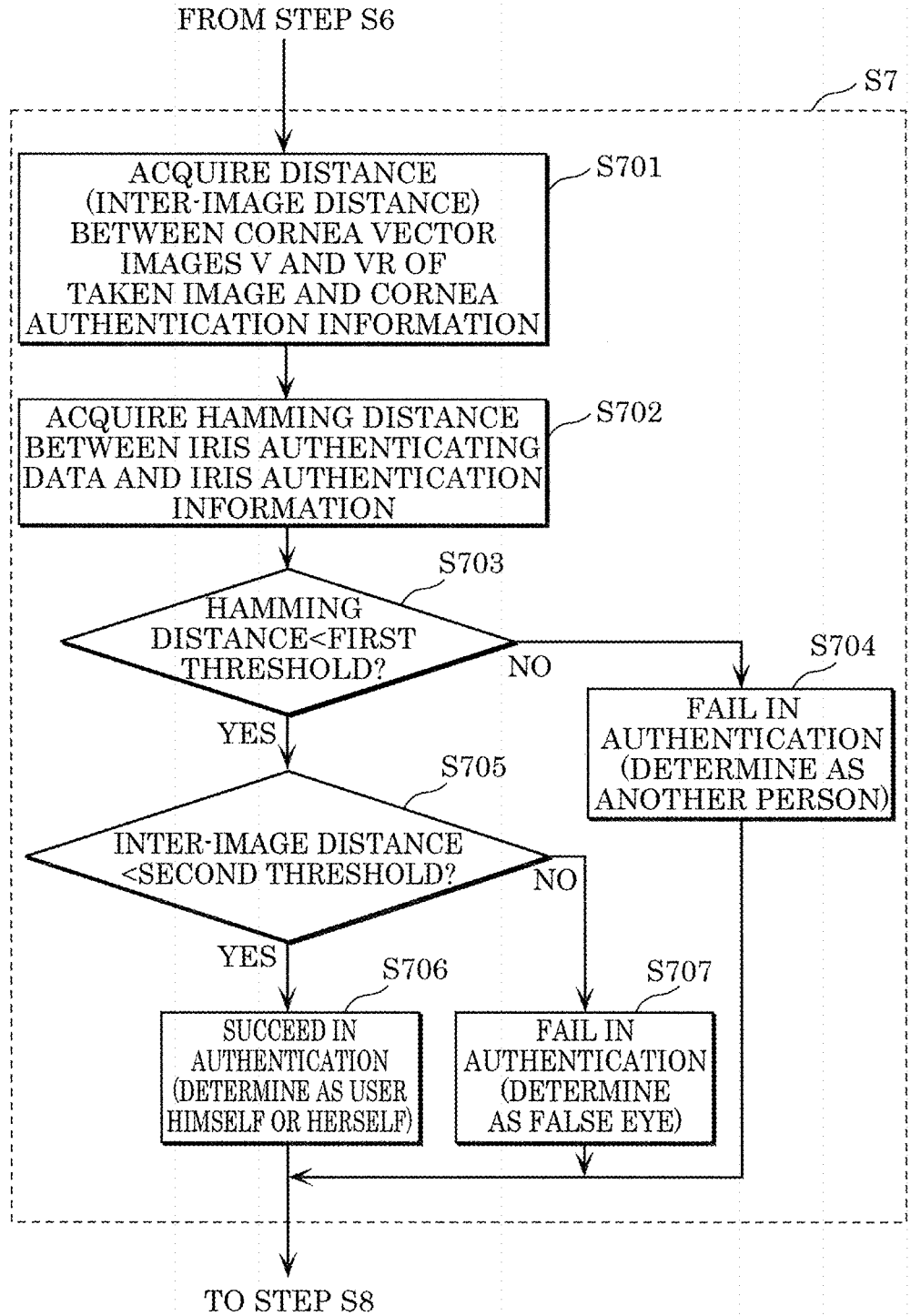
FIG. 17 is a flowchart illustrating an example of details of an integration process of authentication results by an integrator.

With reference to FIG. 17, details of the process in step S7 will be described. FIG. 17 is a flowchart illustrating an example of details of the integration process of the authentication results by integrator 17. In step S701, integrator 17 acquires distance COR_DIST between cornea vector image V for authentication and reference cornea vector image VR from cornea authenticator 15.

Next, in step S702, integrator 17 acquires Hamming distance IRIS_DIST between real part IR for authentication and imaginary part II for authentication that are iris authenticating data, and reference real part IRR and reference imaginary part IIR that are the iris authentication information, from iris authenticator 16.

Next, in step S703, integrator 17 carries out an authentication process using data concerning the iris. More specifically, integrator 17 determines whether or not Hamming distance IRIS_DIST is smaller than fixed first threshold THRESH1. When the Hamming distance is smaller than the first threshold (Yes in step S703), integrator 17 proceeds to step S705, and when the Hamming distance is the first threshold or more (No in step S703), integrator 17 proceeds to step S704.

In step S704, integrator 17 determines that a user corresponding to real part IR for authentication and imaginary part II for authentication does not correspond to, that is, is a person different from the user corresponding to reference real part IRR and reference imaginary part IIR, because the Hamming distances differ significantly. Thereby, integrator 17 outputs an authentication result that authentication of the user fails.

In step S705, integrator 17 carries out an authentication process using data concerning a cornea. More specifically, integrator 17 determines whether or not distance COR_DIST between cornea vector image V for authentication and reference cornea vector image VR is smaller than fixed second threshold THRESH2. Integrator 17 proceeds to step S706 when distance COR_DIST is smaller than the second threshold (Yes in step S705), and proceeds to step S707 when the above described distance is larger than or equal to the second threshold (No in step S705).

In step S706, integrator 17 determines the user corresponding to cornea vector image V for authentication to be a user corresponding to reference cornea vector image VR. Thereby, integrator 17 outputs an authentication result that authentication of the user succeeds, or an authentication result including information on the determined user or the like. Note that integrator 17 may output reliability or similarity of the determined user, in accordance with the value of distance COR_DIST.

In step S707, integrator 17 determines that the user corresponding to cornea vector image V for authentication does not correspond to the user corresponding to reference cornea vector image VR because distances COR_DIST differ significantly. Thereby, integrator 17 outputs an authentication result that authentication of the user fails. In this case, there is a possibility that the cornea of the user has abnormality. For example, there is also a possibility that the subject of the image used in generation of cornea vector image V for authentication is not a living user, but is a printed image of an iris pattern of a user on which a contact lens or the like is set, that is, there is a doubt of a false eye. Therefore, integrator 17 may not only notify the user of an authentication failure but also may notify an administrator of authentication system 1 of doubt of a false eye, and information on the user who is suspected of using a false eye.

Further, authentication apparatus 100 may repeat the processes in step S701 to S707. For example, in the series of processes of steps S701 to S707, authentication apparatus 100 may perform authentication between one object in an image taken by camera 30 and one user ID in the database. In this case, the user ID corresponding to reference real part IRR and reference imaginary part IIR that are used in calculation of inter-image distance COR_DIST acquired in step S701 and the user ID corresponding to reference cornea vector image VR that is used in calculation of the hamming distance acquired in step S702 are the same.

Further, as for the process of integrator 17, the process concerning inter-image distance COR_DIST and the process concerning the Hamming distance do not have to be made independent of each other as described above, but weights may be assigned to the two distances. In this case, a distance obtained by adding the two distances after the weights are assigned may be evaluated with respect to a threshold. For example, when the cornea of a user is subjected to surgical treatment for recovery of eyesight of the user such as LASIK, cataract treatment or the like, and/or when the user daily wears contact lenses, a partial loss, a damage or the like can exist in the cornea, so that the weight to the inter-image distance may be decreased to prevent erroneous authentication. In this way, it is possible to make comprehensive determination.

The configuration of polarization imaging device 30a of camera 30 is not limited to the aforementioned configuration. For example, mosaic polarizing filter 30ab includes the polarizing filters having the four different polarization transmission axes, but may include polarizing filters having three polarization transmission axes or fewer, or may include polarizing filters having five polarization transmission axes or more. The number of kinds of polarizing filters can be a number with which the approximation process of the periodic function by periodic function approximator 14 is enabled. For example, in the case of three different polarizing filters, azimuth angles of the polarization transmission axes of 0°, 45°, 90°, and the like have no problem because the process of periodic function approximator 14 is possible. Further, azimuth angles of different polarization transmission axes are not limited to the aforementioned configuration.

[1-4. Effect]

As described above, the amplitude image and the phase image which are generated by authentication apparatus 100 according to embodiment 1 show corneal information, and the average image shows iris information. Authentication apparatus 100 performs authentication of an owner of an eye through authentication of the eye using the corneal information and the iris information. Such eye authentication by authentication apparatus 100 can have high accuracy. Further, use of at least three eyeball images, for example, images L0C0, L0C45, L0C90, and the like, also enhances precision of calculation of the amplitude image, the phase image, and the average image. By using information on both iris and cornea, countermeasures against false eyes and enhancement of precision of individual information can be simultaneously realized. Further, use of polarized light solves the problem of difficulties in image processing of iris detection for low brightness contrast across the boundary between the iris and the white of the eye due to the influence of the wavelength band of IR that is used in illumination.

Further, authentication apparatus 100 advances from the conventional iris authentication, and separates corneal information and iris information by using polarizing illumination and polarization imaging, and uses individual biological information together such as a surface shape, optical anisotropic characteristics, and stress characteristics of a transparent cornea. Since a cornea is optically transparent, it is very difficult to extract the polarization optical characteristic of the cornea and simulate the optical characteristics by a contact lens or the like. Accordingly, by using both iris information and corneal information, countermeasures against false eyes and enhancement of accuracy of the individual information can be both realized, for the fields requiring highly accurate personal authentication such as Internet banking. When the IR wavelength band for use in illumination reaches a vicinity of 940 nm, there arises the problem that brightness contrast between an iris and a white of the eye decreases and image processing of iris detection is difficult. However, a polarization image is effective in enhancement of the contrast of the boundary between the iris and the white of an eye, and can be applied to systems using wide variety of IR illumination. Further, authentication of an eye of another living person and determination of a false eye using a contact lens or the like are enabled as different determinations, so that the present embodiment is effective in detection of a crime using a false eye.

Embodiment 2

Authentication apparatus 2100 according to embodiment 2 will be described. Authentication apparatus 2100 according to embodiment 2 differs from embodiment 1 in configurations of illumination device 220 and camera 230. Hereinafter, a difference from embodiment 1 will be mainly described, and explanation of points similar to embodiment 1 will be omitted.

Figure 18:
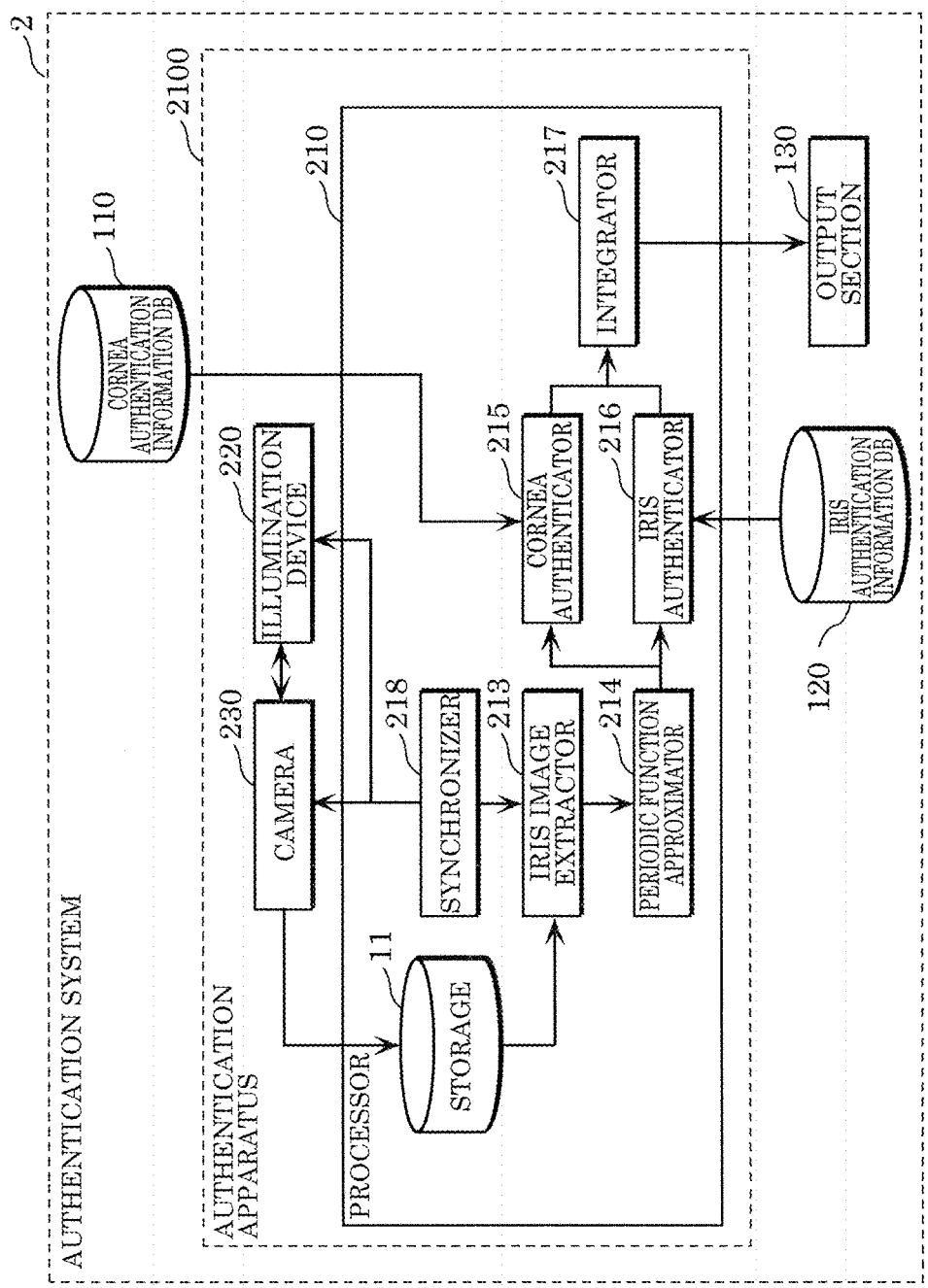
FIG. 18 is a block diagram illustrating an example of a functional configuration of an authentication system according to embodiment 2.
Figure 19:
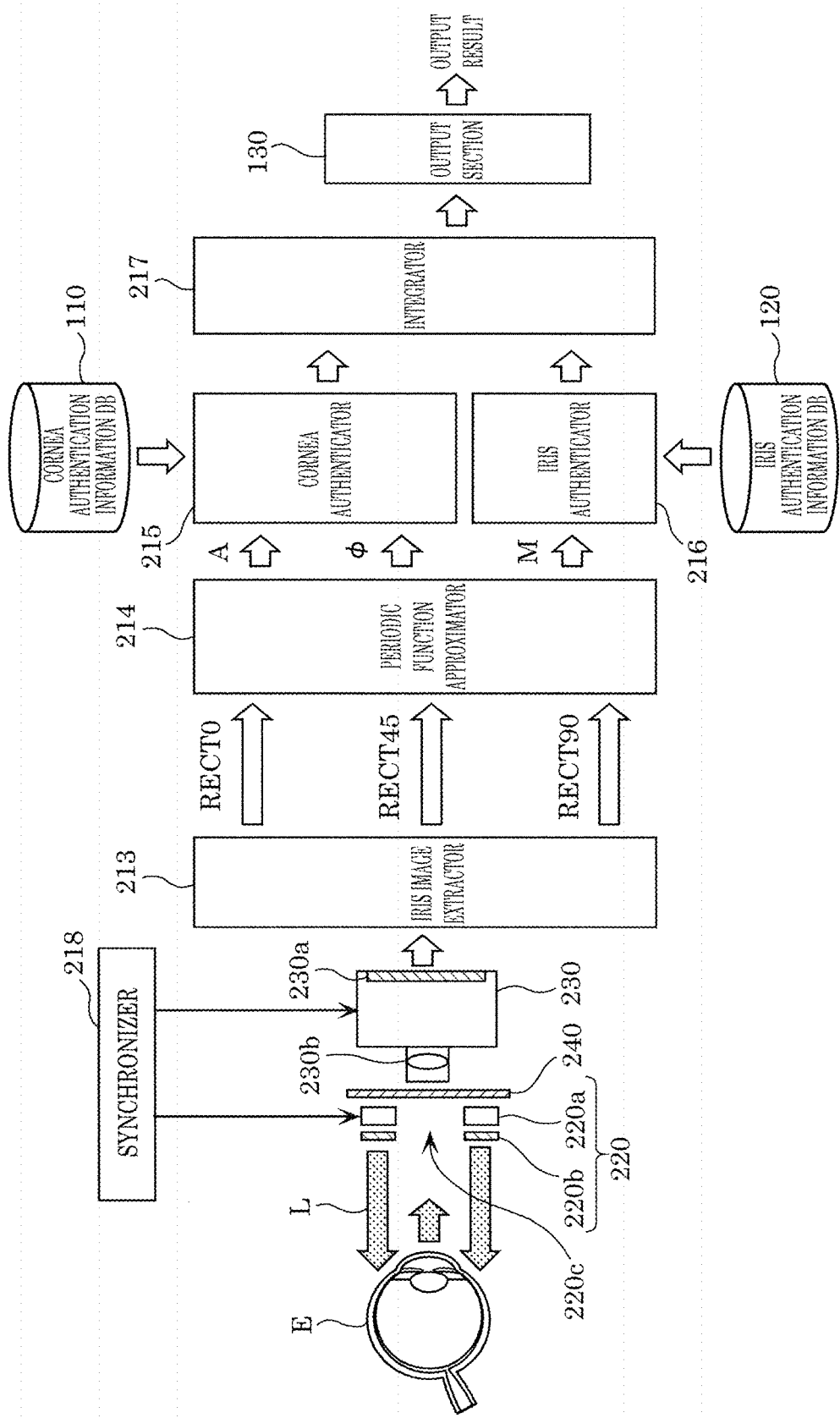
FIG. 19 is a schematic view illustrating an example of a process by components of the authentication system according to embodiment 2.

FIG. 18 is a block diagram illustrating an example of a functional configuration of authentication system 2 according to embodiment 2. FIG. 19 is a schematic diagram illustrating an example of processes by components of authentication system 2 according to embodiment 2. As illustrated in FIG. 18 and FIG. 19, authentication system 2 includes authentication apparatus 2100, and cornea authentication information DB 110, iris authentication information DB 120, and output section 130 similar to those in embodiment 1. Authentication apparatus 2100 includes processor 210, illumination device 220, and camera 230. Processor 210 includes store 11, iris image extractor 213, periodic function approximator 214, cornea authenticator 215, iris authenticator 216, integrator 217, and synchronizer 218.

Camera 230 includes ordinary imaging device 230a having no polarizing filter. In front of objective lens 230b, polarizing plate 240 is disposed. In the present embodiment, polarizing plate 240 is a linear polarizing plate with an azimuth angle of a polarization transmission axis of 0°, but the azimuth angle of the polarization transmission axis is not limited to 0°.

Figure 20:
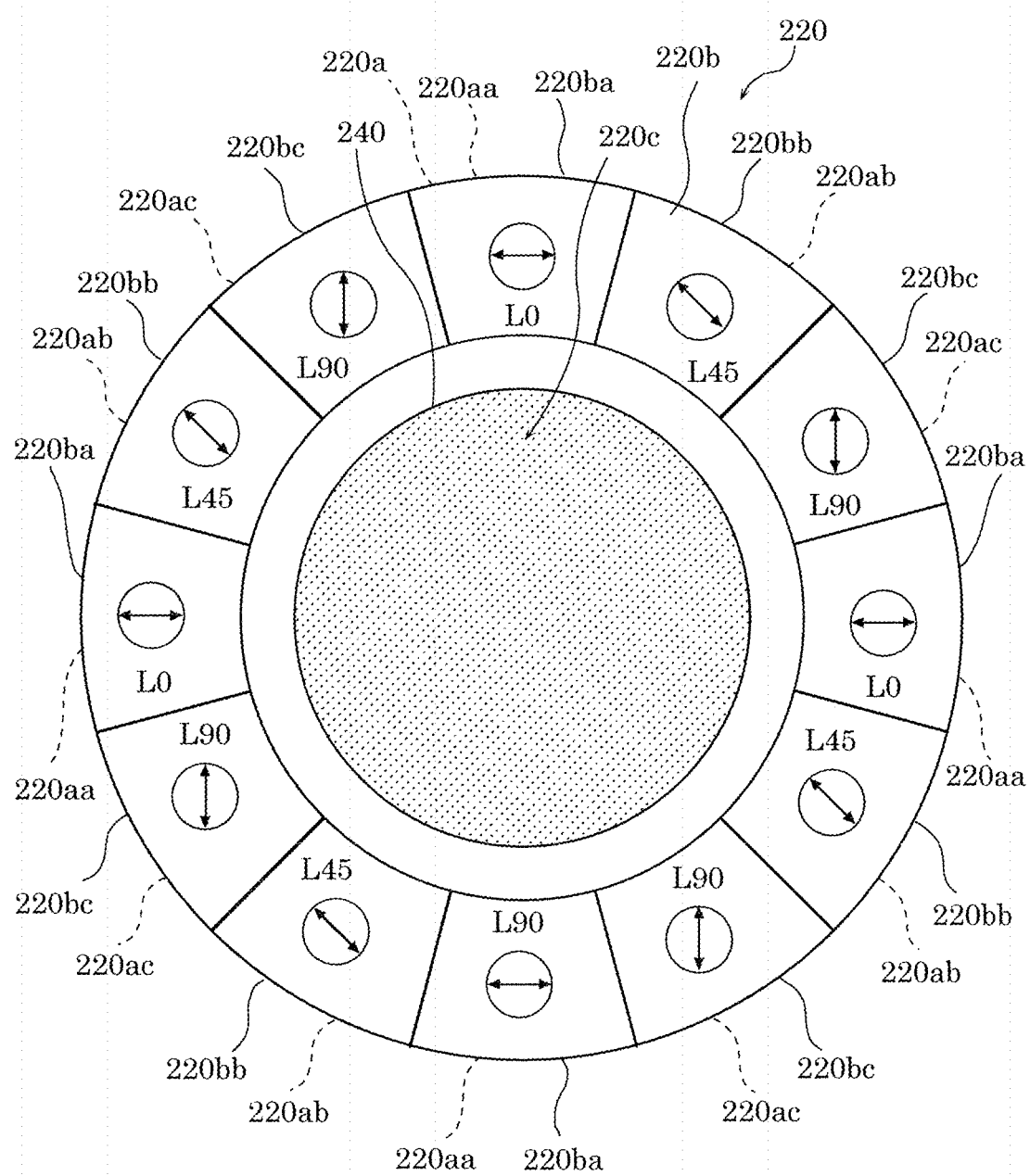
FIG. 20 is a schematic front view of an illumination device according to embodiment 2.

Illumination device 220 includes ring illumination of three channels. FIG. 20 illustrates a schematic front view of illumination device 220 according to embodiment 2. As illustrated in FIG. 20, illumination section 220a of illumination device 220 includes first light sources 220aa, second light sources 220ab, and third light sources 220ac which are disposed annularly around opening portion 220c. In the present embodiment, first light sources 220aa, second light sources 220ab, and third light sources 220ac are disposed by repeating this order along a circumference. Configurations of first light source 220aa, second light source 220ab, and third light source 220ac are similar to the configuration of first light source 20ac in embodiment 1. Illumination section 220a is configured to cause the plurality of first light sources 220aa to emit light simultaneously, and thereby emits ring-shaped illuminating light. Further, illumination section 220a is configured to cause the plurality of second light sources 220ab to emit light simultaneously, and thereby emits ring-shaped illuminating light. Further, illumination section 220a is configured to cause the plurality of third light sources 220ac to emit light simultaneously, and thereby emits ring-shaped illuminating light. First light source 220aa, second light source 220ab, and third light source 220ac are configured to light up independently from one another.

Polarizing section 220b includes first polarizing filters 220ba, second polarizing filters 220bb, and third polarizing filters 220bc that are disposed annularly around opening portion 220c. An example of first polarizing filter 220ba, second polarizing filter 220bb, and third polarizing filter 220bc is a polarizing plate or a polarizing film. In the present embodiment, first polarizing filters 220ba, second polarizing filters 220bb, and third polarizing filters 220bc are disposed by iteration of this order along a circumference.

First polarizing filter 220ba has a polarization transmission axis with an azimuth angle of 0°. First polarizing filter 220ba is disposed between first light source 220aa and a subject, and changes light emitted from first light source 220aa into linear polarized light with the azimuth angle of 0°. Second polarizing filter 220bb has a polarization transmission axis with an azimuth angle of 45°. Second polarizing filter 220bb is disposed between second light source 220ab and the subject, and changes light emitted from second light source 220ab into a linear polarized light with the azimuth angle of 45°. Third polarizing filter 220bc has a polarization and transmission axis with the azimuth angle of 90°. Third polarizing filter 220bc is disposed between third light source 220ac and the subject, and changes light emitted from third light source 220ac into a linear polarized light with the azimuth angle of 90°.

Illumination device 220 like this is a ring illumination with three channels, and sequentially emits three kinds of linear polarized light with polarizing directions differing from one another by 45°. Between first light source 220aa, second light source 220ab, and third light source 220ac, and first polarizing filter 220ba, second polarizing filter 220bb, and third polarizing filter 220bc, a diffusion plate as in embodiment 1 may be disposed.

Synchronizer 218 in processor 210 controls operations of illumination device 220 and camera 230 so as to synchronize three kinds of illumination of illumination device 220, and exposure timing of camera 230, that is, timing of taking images. More specifically, synchronizer 218 controls switching of first light source 220aa, second light source 220ab, and third light source 220ac of illumination device 220 between on and off to cause first light source 220aa, second light source 220ab, and third light source 220ac to light up sequentially in terms of time. Further, synchronizer 218 causes camera 230 to take an image at least once and to acquire at least one image, while first light source 220aa, second light source 220ab, and third light source 220ac are on.

Therefore, camera 230 picks up three kinds of polarization images. More specifically, in a period of emission of linear polarized lights L0, L45 and L90, reflection light from eyeball E, which passes through polarizing plate 240 with an azimuth angle of a polarization transmission axis of 0° is taken by camera 230. Consequently, three kinds of polarization images which are taken can be referred to as "L0C0", "L45C0", and "L9000". These polarization images substantially coincide with polarization images L0C0, L0C45, and L090 generated by pixel selector 12 in embodiment 1. This is because the cornea of eye E can be assumed to have circular symmetry. As a result, in the present embodiment, iris image extractor 213 generates three kinds of rectangular images RECT0, RECT45, and RECT90. Therefore, processes by iris image extractor 213, periodic function approximator 214, cornea authenticator 215, iris authenticator 216, and integrator 217 are in common with the processes in embodiment 1. Therefore, explanation of these process contents will be omitted.

As described above, authentication apparatus 2100 takes an image by camera 230 and acquires a plurality of polarization images, while sequentially illuminating eye E of an object of authentication with three kinds of linear polarized light by illumination device 220. Subsequently, authentication apparatus 2100 performs an authentication process as in embodiment 1 by using the acquired polarization images. A minimum required number of sampling points to determine a periodic function (sine function in this case) by periodic function approximator 214 can be three, and from this viewpoint, in the present embodiment, three different kinds of polarized illuminating light are used.

As described above, according to authentication apparatus 2100 according to embodiment 2, an effect similar to the effect of embodiment 1 is produced. Further, authentication apparatus 2100 can obtain an authentication result similar to the authentication result in embodiment 1 by a slight change of the illumination device even by using ordinary camera 230 instead of a polarization camera including a polarization imaging device, and has versatility.

[Advantage of Using Polarized Illumination]

For the authentication apparatus according to the embodiment, polarized illumination is used to separate corneal information and iris information, use of polarized illumination brings about other advantages, and hereinafter the other advantages will be described.

Figure 21A:
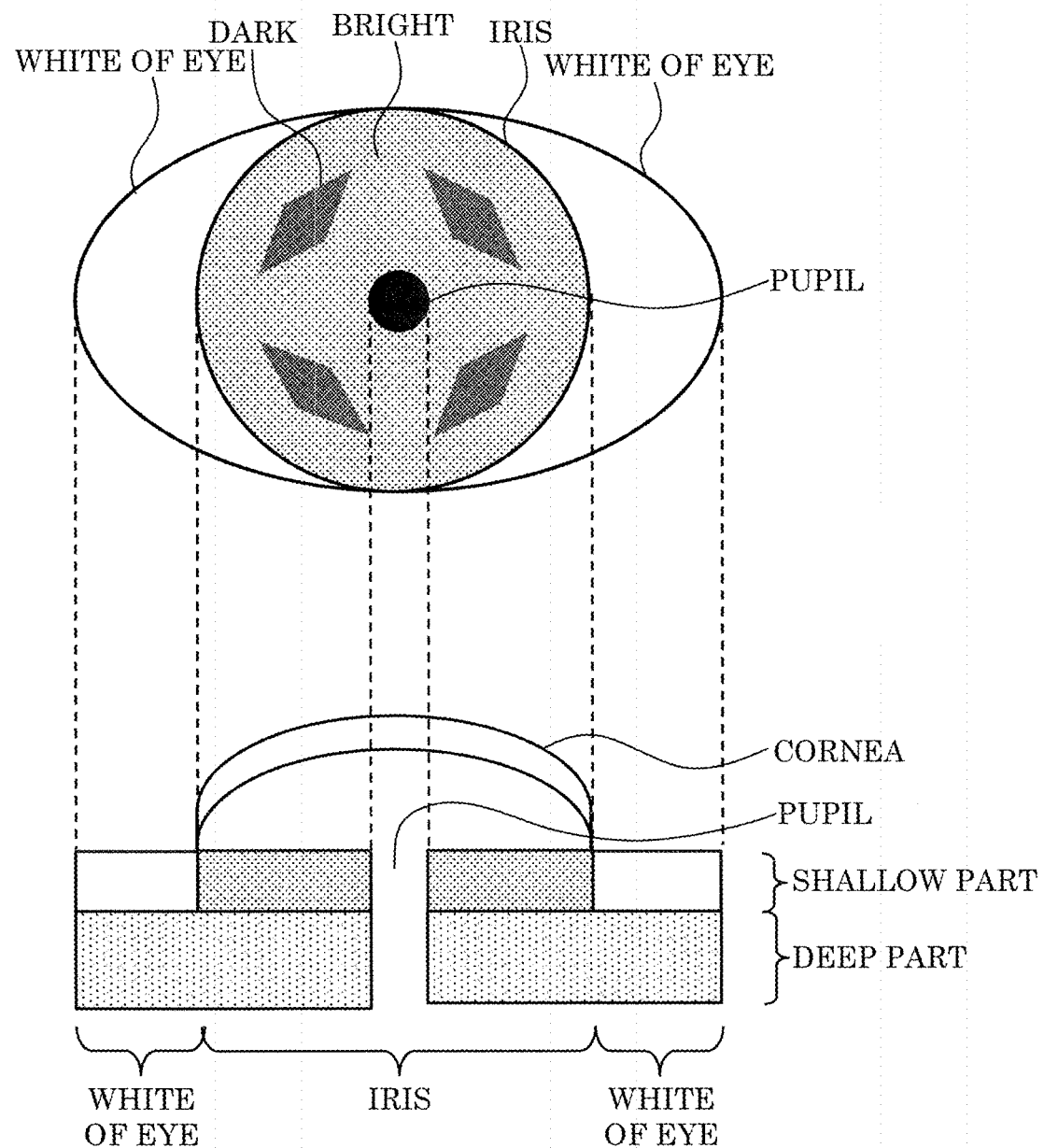
FIG. 21A is a diagram explaining that brightness contrast of an iris between a white of an eye is enhanced by a polarization imaging by using a model.
Figure 21B:
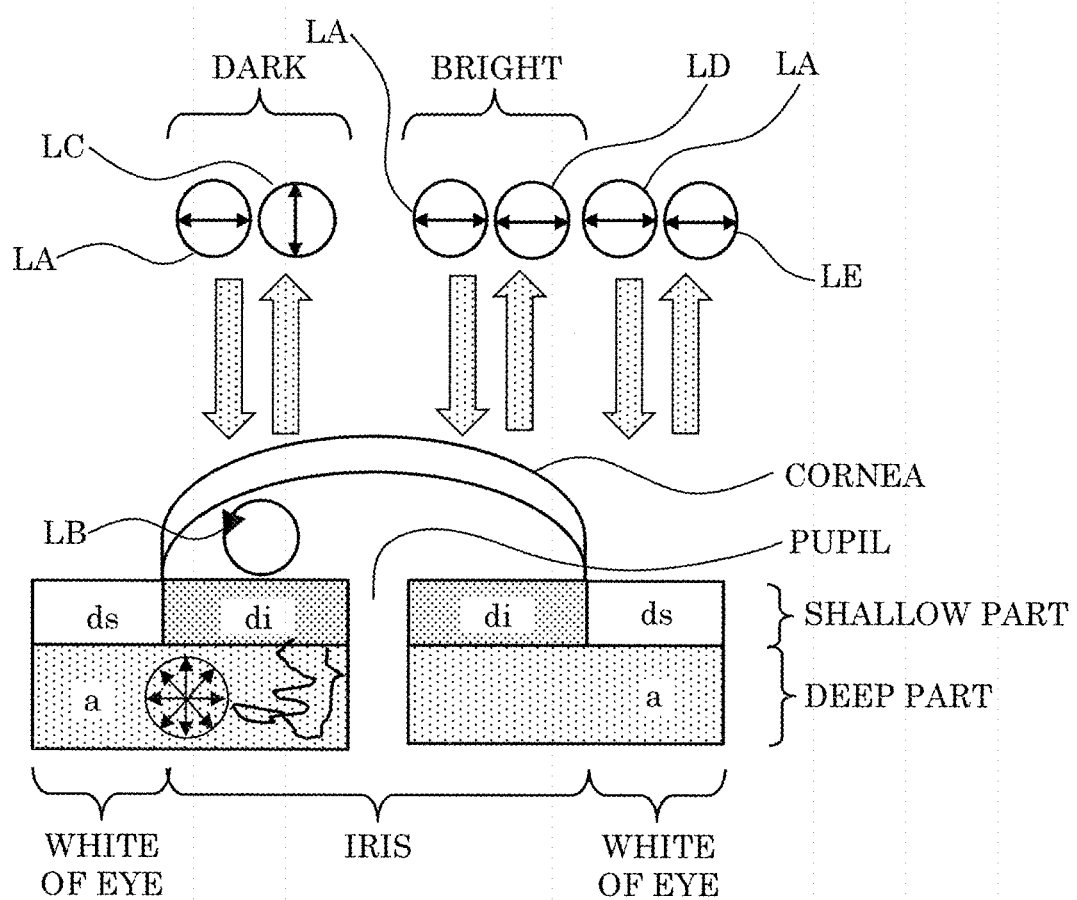
FIG. 21B is a view explaining that brightness contrast between the iris and the white of the eye is enhanced by a polarization imaging by using a model.

FIG. 21A and FIG. 21B are diagrams explaining that brightness contrast between an iris and a white of an eye is enhanced by a polarization imaging using a model. The upper part of FIG. 21A is a front view of an eyeball, and as in image L0C0 in FIG. 6, in an iris region, two regions of a bright part (bright) and a dark part (dark) are generated. In the lower section part of FIG. 21A, a section of the eyeball is modeled. The iris region is covered with a cornea, and outside of the iris region, a region of the white of the eye which is not covered with the cornea exists. The iris region and the region of the white of the eye are each modeled in two-layer structures with a shallow part and a deep part. In both of the iris region and the region of the white of the eye, scattering of light occurs in the shallow parts, and absorption of infrared light occurs in the deep parts because capillary vessels (water) exist in the deep parts.

In the polarization image in the parallel polarization state like image L0C0 in FIG. 6, brightness contrast between the iris and the white of the eye is emphasized, and the reason of this can be described as follows. The light incident on the iris passes through the cornea first, passes through the inside of the aqueous humor under the cornea next, and then reaches the iris. A part of light is reflected from the iris, and a part of the light enters the deep part of the iris. The light that enters the deep part causes multiple scattering with scattering coefficient d to change to unpolarized light, while being absorbed by the water in blood vessels in the deep part with absorption coefficient a. For IR light in the vicinity of 940 nm, absorption by melanin in the iris is considerably small. Therefore, absorption coefficients on the iris and the white of the eye are set as the same and at a. Since no polarization exists in observation with unpolarized light, brightness is determined by only absorption. Therefore, as in the following table, the brightness contrast between the iris and the white of the eye=1 is established. That is, with only observation of the brightness, the boundary between the iris and the white of the eye is (theoretically) invisible.

TABLE 1

| Brightness of iris | Brightness of white of eye | Contrast |
|---|---|---|
| 1 - a | 1 - a | 1 |

Next, in FIG. 21B, a case of observation under polarized light is discussed in which an object is illuminated with linear polarized light, and the object is observed in the parallel polarization state. For example, the case of acquiring image L0C0 is considered.

The scattering coefficient of the iris is set as di, and the scattering coefficient of the white of an eye is set as ds. The scattering coefficient used here means a rate of the light which changes to unpolarized light due to multiple scattering in the shallow parts of media of the iris and the white of the eye. Linear polarized light LA with the azimuth angle of 0° that is incident is considered to change into circular polarized light LB due to the change in the phase of the polarized light owing to birefringence at the time of passing through the cornea in the dark part (dark) which is dark due to corneal birefringence in the iris, and further change into linear polarized light LC orthogonal to the incident light at the time point when circular polarized light LB passes through the cornea again and returns to the camera. Therefore, among the brightness observed by the camera, the brightness of the component of linear polarized light LC is zero because the component is orthogonal to the polarization transmission axis of 0° of the camera. Therefore, only unpolarized light components are observed by the camera, and when the components are considered to be remaining part of circular polarized light LB that is unpolarized by multiple scattering by the scattering effect of the shallow part of the iris, and is subsequently absorbed in the deep part, brightness $\Pi_{dark}$ in the dark part (dark) is expressed as expression 4 as follows.

[Math. 4]

$$\Pi_{dark} = \frac{di(1-a)}{2} \qquad \text{Expression 4}$$

Next, in brightness $\Pi_{bright}$ of the bright part (bright) that becomes bright with birefringence in the iris, the polarization components of linear polarized light LA do not change in polarization phase at the time of passing through the cornea, do not become multiple scattering components, but are reflected in the vicinity of the surface layer to return to the camera directly as linear polarized light LD, and become brighter than in the dark part (dark) region correspondingly to the amount of the components passing through the same parallel polarizing plate. Therefore, brightness $\Pi_{bright}$ can be expressed as expression 5 as follows.

[Math. 5]

$$\Pi_{bright} = \Pi_{dark} + 1 - di = 1 - \frac{di(1+a)}{2} \qquad \text{Expression 5}$$

Next, there is no birefringence in the white of the eye since there is no cornea, and linear polarized light LA returns as return light LE in the same polarization state, so that the white of the eye is in a state similar to the state of the bright part (bright) of the iris. Therefore, brightness IS in the white of the eye can be expressed as expression 6 as follows by using scattering coefficient ds of the white of the eye.

[Math. 6]

$$IS = (1 - ds) + \frac{(1-a)ds}{2} = 1 - \frac{ds(1+a)}{2} \qquad \text{Expression 6}$$

As a result, the contrast between brightness $\Pi_{bright}$ of the bright part (bright) of the iris and brightness IS of the white of the eye can be expressed as expression 7 as follows. Here, DS=ds(1+a), and Di=di(1+a). These are amounts determined from multiple scattering degree ds and absorption coefficient a, and Ds/Di=ds/di. Ds represents the degree of multiple scattering in the shallow part of the white of the eye, and Di represents the degree of multiple scattering in the shallow part of the iris.

[Math. 7]

$$\frac{IS}{\Pi} = \left(1 - \frac{ds(1+a)}{2}\right) \bigg/ \left(1 - \frac{di(1+a)}{2}\right) \qquad \text{Expression 7}$$
$$= \frac{2 - ds(1+a)}{2 - di(1+a)} = \frac{2 - Ds}{2 - Di}$$

Figure 22:
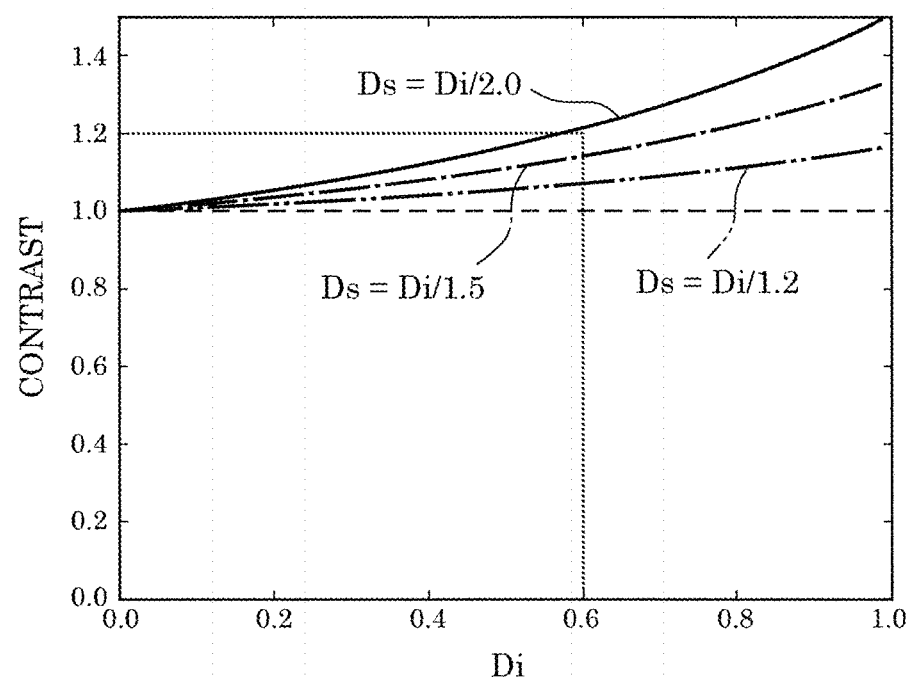
FIG. 22 is a diagram illustrating enhancement of the brightness contrast by polarization imaging.

FIG. 22 illustrates a relationship among the brightness contrast, the degree of multiple scattering Di in the iris shallow part and the degree of multiple scattering Ds in the shallow part of the white of the eye. For the graph shown in FIG. 22, it is assumed for Ds of the white of the eye and Di of the iris that Di>Ds (the degree of multiple scattering Di in the shallow part of the iris is larger than the degree of multiple scattering Ds in the shallow part of the white of the eye). The graph includes curves for three variations of Ds with a horizontal axis for Di and a vertical axis for the brightness contrast. For example, when Di=0.6 and therefore Ds=Di×(1/2.0)=0.30, the brightness contrast is increased to be approximately 1.2. In this way, use of polarized light enhances the contrast between the iris and the white of the eye.

(Others)

Although the authentication apparatus, etc. according to one or more aspects have been described thus far based on the embodiments, the present disclosure is not limited to the embodiments. Other forms in which various modifications apparent to those skilled in the art are applied to the embodiments, or forms structured by combining structural components of different aspects of the embodiments may be included within the scope of the one or more aspects, unless such changes and modifications depart from the scope of the present disclosure.

For example, in embodiments 1 and 2, the illumination devices are all described as ring-shaped, but the illumination device does not always have to be of the ring-shaped configuration. The illumination device can be of the configuration capable of emitting linear polarized light.

Further, in embodiment 1, the four kinds of polarization images are simultaneously acquired by one shot under illuminating light with a fixed polarizing direction, using the camera including the polarization imaging device. Further, in embodiment 2, the three kinds of polarization images are acquired under illuminating light with polarizing directions sequentially changed, using a polarizing plate and an ordinary camera. The number of kinds of the polarization images to be acquired can be three or more, and with either of the configurations, effective authentication is enabled. Further, an illumination device and a camera which are of a combination of the configurations of embodiments 1 and 2 are also applicable.

Further, in the embodiments, the azimuth angle of the polarization transmission axis of the illumination device is set in increments of 45°, and the azimuth angle of the polarization transmission axis of the polarizing filter is set in increments of 45°, but the azimuth angles are not limited to this. The azimuth angles of the respective polarization transmission axes may be set in increments of any angle. The azimuth angle of the polarization transmission axis of the existing polarizing plate is set in increments of 45°, so that if the azimuth angle of the polarization transmission axis is set in increments of 45°, such existing polarizing plate can be directly used. Therefore, cost can be reduced.

In addition, as described above, the techniques according to present disclosure may be implemented as a system, an apparatus, a method, an integrated circuit, a computer program, or recording medium such as a computer-readable recording disk, or may be implemented as an arbitrary combination of the system, the apparatus, the method, the integrated circuit, the computer program, and the recoding medium. The computer-readable recording medium includes, for example, a non-volatile recording medium such as a CD-ROM.

For example, each of the processing units included in the authentication apparatus, etc. according to the above-described embodiments is typically implemented as a large scale integration (LSI) which is an integrated circuit. These processing units may be made as separate individual chips, or as a single chip to include a part or all thereof.

Furthermore, the integrated circuit is not limited to the LSI, and may be implemented by a dedicated circuit or a general-purpose processor. A Field Programmable Gate Array (FPGA) which allows programming after LSI manufacturing or a reconfigurable processor which allows reconfiguration of the connections and settings of circuit cells inside the LSI may be used.

Furthermore, in the above-described embodiments, each of the structural components may be configured in the form of an exclusive hardware product, or may be realized by executing a software program suitable for the structural components. Each of the structural components may be realized by means of a program executor, such as a CPU and a processor, reading and executing the software program recorded on a recording medium such as a hard disk or a semiconductor memory.

In addition, a part or all of the above-described structural components may be configured as an integrated circuit (IC) card which can be attached and detached or as a stand-alone module. The IC card or the module is a computer system configured from a microprocessor, a ROM, a RAM, and the like. The IC card or the module may include the above-described LSI or a system LSI. The IC card or the module achieves its function through the microprocessor's operation according to the computer program. These IC card and the module may also be implemented to be tamper-resistant.

The authentication method according to the present disclosure may be implemented by a processor such as a micro processing unit (MPU), a CPU, etc., a circuit such as an LSI, etc., an IC card or a stand-alone module, etc.

In addition, the technique according to the present disclosure may be implemented by a software program or a digital signal including a software program, or a non-transitory computer-readable recording medium having a program recorded thereon. It should be understood that the above-described program can be distributed via a transmission medium such as the Internet.

In addition, each of the numerals such as ordinal numbers and numerical quantities used in the above description is used for exemplification to specifically describe the technique of the present disclosure, and the present disclosure is not limited by the numerals used for exemplification. In addition, the relation of connection between the structural components is used for exemplification to specifically describe the technique of the present disclosure, and the relation of connection which implements the functions of the present disclosure is not limited to this.

Furthermore, the division of the functional blocks illustrated in the block diagrams has been presented as one example. Accordingly, a plurality of functional blocks may be implemented as one functional block, or one functional block may be divided into a plurality of functional blocks or a portion of the functions may be transferred to another functional block. In addition, functions of a plurality of functional blocks having similar functions may be processed by single hardware or software in parallel or in time division.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The technique of the present disclosure can be widely applied to the technology of authenticating an iris and a cornea from an image including the iris.

What is claimed is:
1. An authentication apparatus, including:
an illumination device that outputs light having a first polarization direction;
a camera that takes a first eyeball image of a user, a second eyeball image of the user, and a third eyeball image of the user, the first eyeball image having a second polarization direction, the second eyeball image having a third polarization direction, the third eyeball image having a fourth polarization direction; and
a control circuit that
(a) acquires cornea authentication information in which a user ID and at least one cornea image are associated with each other, and iris authentication information in which a user ID and at least one iris image are associated with each other,
(b) generates an amplitude image, a phase image, and an average image by using the first eyeball image, the second eyeball image, and the third eyeball image,
(c) authenticates a user ID corresponding to the average image by referring to the iris authentication information,
(d) authenticates a user ID corresponding to the amplitude image and the phase image, by referring to the cornea authentication information, and
(e) determines a user ID corresponding to the user, by using an authentication result of the user ID in (c), and an authentication result of the user ID in (d).
2. The authentication apparatus according to claim 1, wherein when the control circuit succeeds in authentication with the user ID in (c), and succeeds in authentication with the user ID in (d), the control circuit determines in (e) that the user ID corresponds to the user.
3. The authentication apparatus according to claim 1, wherein when the control circuit fails in authentication with the user ID in (c), the control circuit determines in (e) that the user ID does not correspond to the user.

4. The authentication apparatus according to claim 1,
wherein when the control circuit succeeds in authentication with a first user ID in (c), and fails in authentication with the first user ID in (d),
the control circuit determines in (e) that the first user ID does not correspond to the user, and
the control circuit
(f) further determines that the first eyeball image, the second eyeball image, and the third eyeball image are false images of an eyeball corresponding to the first user ID.

5. The authentication apparatus according to claim 1,
wherein the control circuit
determines a periodic function expressing periodicity of pixel values of pixels in corresponding pixel positions in the first eyeball image, the second eyeball image, and the third eyeball image, with respect to each of the pixel positions, and
generates the amplitude image with a pixel value which is an amplitude of the periodic function, the phase image with a pixel value which is a phase of the periodic function, and the average image with a pixel value which is an average value of the periodic function.

6. The authentication apparatus according to claim 1,
wherein the camera takes an image including the first eyeball image, the second eyeball image, and the third eyeball image together at a time of output of light having the first polarization direction, and
the control circuit separates, in (b), the first eyeball image, the second eyeball image, and the third eyeball image from the image taken by the camera.

7. The authentication apparatus according to claim 3,
wherein when the control circuit fails in authentication with the user ID in (c),
the control circuit skips authentication of the user ID in (d), and determines in (e) that the user ID does not correspond to the user.

8. An authentication apparatus, including:
an illumination device that outputs light having a first polarization direction, light having a second polarization direction, and light having a third polarization direction;
a camera that takes an image of light polarized in a fourth polarization direction, and takes a first eyeball image of a user using light having the first polarization direction, a second eyeball image of the user using light having the second polarization direction, and a third eyeball image of the user using light having the third polarization direction; and
a control circuit that
(a) acquires cornea authentication information in which a user ID and at least one cornea image are associated with each other, and iris authentication information in which a user ID and at least one iris image are associated with each other,
(b) generates an amplitude image, a phase image, and an average image by using the first eyeball image, the second eyeball image, and the third eyeball image,
(c) authenticates a user ID corresponding to the average image by referring to the iris authentication information,
(d) authenticates a user ID corresponding to the amplitude image and the phase image, by referring to the cornea authentication information, and
(e) determines a user ID corresponding to the user, by using an authentication result of the user ID in (c), and an authentication result of the user ID in (d).

9. The authentication apparatus according to claim 8,
wherein when the control circuit succeeds in authentication with the user ID in (c), and succeeds in authentication with the user ID in (d), the control circuit determines in (e) that the user ID corresponds to the user.

10. The authentication apparatus according to claim 8,
wherein when the control circuit fails in authentication with the user ID in (c), the control circuit determines in (e) that the user ID does not correspond to the user.

11. The authentication apparatus according to claim 8,
wherein when the control circuit succeeds in authentication with a first user ID in (c), and fails in authentication with the first user ID in (d),
the control circuit determines in (e) that the first user ID does not correspond to the user, and
the control circuit
(f) further determines that the first eyeball image, the second eyeball image, and the third eyeball image are false images of an eyeball corresponding to the first user ID.

12. The authentication apparatus according to claim 8,
wherein the control circuit
determines a periodic function expressing periodicity of pixel values of pixels in corresponding pixel positions in the first eyeball image, the second eyeball image, and the third eyeball image, with respect to each of the pixel positions, and
generates the amplitude image with a pixel value which is an amplitude of the periodic function, the phase image with a pixel value which is a phase of the periodic function, and the average image with a pixel value which is an average value of the periodic function.

13. The authentication apparatus according to claim 8,
wherein the camera takes the first eyeball image, the second eyeball image, and the third eyeball image individually at a time of output of the light having the first polarization direction, the light having the second polarization direction, and the light having the third polarization direction, respectively.

14. The authentication apparatus according to claim 10,
wherein when the control circuit fails in authentication with the user ID in (c),
the control circuit skips authentication of the user ID in (d), and determines in (e) that the user ID does not correspond to the user.

15. An authentication method, including:
(a) outputting light having a first polarization direction;
(b) at a time of the outputting of the light having the first polarization direction, taking a first eyeball image of a user, a second eyeball image of the user, and a third eyeball image of the user, the first eyeball image having a second polarization direction, the second eyeball image having a third polarization direction, the third eyeball image having a fourth polarization direction;
(c) generating an amplitude image, a phase image, and an average image by using the first eyeball image, the second eyeball image, and the third eyeball image;
(d) acquiring cornea authentication information in which a user ID and at least one cornea image are associated with each other, and iris authentication information in which a user ID and at least one iris image are associated with each other;
(e) authenticating a user ID corresponding to the average image by referring to the iris authentication information;

(f) authenticating a user ID corresponding to the amplitude image and the phase image, by referring to the cornea authentication information; and (g) determining a user ID corresponding to the user, by using an authentication result of the user ID in (e), and an authentication result of the user ID in (f), wherein at least one of (a) to (g) is executed by at least one control circuit.

16. The authentication method according to claim 15, wherein when the authenticating of the user ID succeeds in (e), and the authenticating of the user ID succeeds in (f), the user ID is determined as corresponding to the user in (g).

17. The authentication method according to claim 15, wherein when the authenticating of the user ID fails in (e), the user ID is determined as not corresponding to the user in (g).

18. The authentication method according to claim 15, wherein when the authenticating of a first user ID succeeds in (e), and the authenticating of the first user ID fails in (f), the first user ID is determined as not corresponding to the user in (g), and the authentication method further includes (h) determining that the first eyeball image, the second eyeball image, and the third eyeball image are false images of an eyeball corresponding to the first user ID.

19. The authentication method according to claim 15, wherein, in (c), a periodic function expressing periodicity of pixel values of pixels in corresponding pixel positions in the first eyeball image, the second eyeball image, and the third eyeball image, is determined with respect to each of the pixel positions, and the amplitude image with a pixel value which is an amplitude of the periodic function, the phase image with a pixel value which is a phase of the periodic function, and the average image with a pixel value which is an average value of the periodic function are generated.

20. The authentication method according to claim 15, wherein, in (b), an image including the first eyeball image, the second eyeball image, and the third eyeball image together is taken at a time of output of light having the first polarization direction, and in (c), the first eyeball image, the second eyeball image, and the third eyeball image are separated from the image taken.

21. The authentication method according to claim 17, wherein when the authenticating of the user ID fails in (e), the authenticating of the user ID is skipped in (f), and the user ID is determined as not corresponding to the user in (g).

22. An authentication method, including:

(a) outputting light having a first polarization direction, light having a second polarization direction, and light having a third polarization direction;

(b) taking a first eyeball image of a user at a time of the outputting of the light having the first polarization direction, taking a second eyeball image of the user at a time of the outputting of the light having the second polarization direction, and taking a third eyeball image of the user at a time of the outputting of the light having the third polarization direction, the first eyeball image having a fourth polarization direction, the second eyeball image having the fourth polarization direction, the third eyeball image having the fourth polarization direction;

(c) generating an amplitude image, a phase image, and an average image by using the first eyeball image, the second eyeball image, and the third eyeball image;

(d) acquiring cornea authentication information in which a user ID and at least one cornea image are associated with each other, and iris authentication information in which a user ID and at least one iris image are associated with each other;

(e) authenticating a user ID corresponding to the average image by referring to the iris authentication information;

(f) authenticating a user ID corresponding to the amplitude image and the phase image, by referring to the cornea authentication information; and (g) determining a user ID corresponding to the user, by using an authentication result of the user ID in (e), and an authentication result of the user ID in (f), wherein at least one of (a) to (g) is executed by at least one control circuit.

23. The authentication method according to claim 22, wherein when the authenticating of the user ID succeeds in (e), and the authenticating of the user ID succeeds in (f), the user ID is determined as corresponding to the user in (g).

24. The authentication method according to claim 22, wherein when the authenticating of the user ID fails in (e), the user ID is determined as not corresponding to the user in (g).

25. The authentication method according to claim 22, wherein when the authenticating of a first user ID succeeds in (e), and the authenticating of the first user ID fails in (f), the first user ID is determined as not corresponding to the user in (g), and the authentication method further includes (h) determining that the first eyeball image, the second eyeball image, and the third eyeball image are false images of an eyeball corresponding to the first user ID.

26. The authentication method according to claim 22, wherein, in (c), a periodic function expressing periodicity of pixel values of pixels in corresponding pixel positions in the first eyeball image, the second eyeball image, and the third eyeball image, is determined with respect to each of the pixel positions, and the amplitude image with a pixel value which is an amplitude of the periodic function, the phase image with a pixel value which is a phase of the periodic function, and the average image with a pixel value which is an average value of the periodic function are generated.

27. The authentication method according to claim 22, wherein the first eyeball image, the second eyeball image, and the third eyeball image are individually taken at a time of output of the light having the first polarization direction, the light having the second polarization direction, and the light having the third polarization direction, respectively.

28. The authentication method according to claim 24, wherein when the authenticating of the user ID fails in (e), the authenticating of the user ID is skipped in (f), and the user ID is determined as not corresponding to the user in (g).

* * * * *